United States Patent [19]
Sada

[11] Patent Number: 5,490,399
[45] Date of Patent: Feb. 13, 1996

[54] REFRIGERATION APPARATUS

[75] Inventor: Shinri Sada, Osaka, Japan

[73] Assignee: Daikin Industries, Ltd., Osaka, Japan

[21] Appl. No.: 307,700

[22] PCT Filed: Mar. 8, 1994

[86] PCT No.: PCT/JP94/00365

§ 371 Date: Sep. 23, 1994

§ 102(e) Date: Sep. 23, 1994

[87] PCT Pub. No.: WO94/20800

PCT Pub. Date: Sep. 15, 1994

[30] Foreign Application Priority Data

Mar. 8, 1993 [JP] Japan ................................ 5-046230

[51] Int. Cl.⁶ .......................... F25B 1/10; F25B 13/00
[52] U.S. Cl. .............. 62/510; 62/160; 62/324.6
[58] Field of Search ................ 62/160, 510, 324.6, 62/175

[56] References Cited

U.S. PATENT DOCUMENTS 5,150,582  9/1992  Gotou .............................. 62/160

FOREIGN PATENT DOCUMENTS

| 58-134463 | 9/1983 | Japan . |
| 1247967 | 9/1989 | Japan . |
| 2126054 | 7/1990 | Japan . |
| 2126053 | 11/1990 | Japan . |
| 3186157 | 4/1991 | Japan . |
| 6026722 | 2/1994 | Japan .................... 62/160 |

*Primary Examiner*—William E. Wayner
*Attorney, Agent, or Firm*—Sixbey, Friedman, Leedom & Ferguson; Gerald J. Ferguson, Jr.; Tim L. Brackett, Jr.

[57] ABSTRACT

Two outdoor units (2A, 2B) are connected to liquid lines (5A, 5B), respectively, and connected to gas lines (6A, 6B), respectively. Each of the gas lines (6A, 6B) is branched to a high-pressure passage (65, 66) and a low-pressure passage (67, 68). The liquid lines (5A, 5B), the high-pressure passages (65, 66) and the low-pressure passage (67, 68) are connected to a main liquid line (4L), a main high-pressure gas line (4H) and a main low-pressure gas line (4W), respectively, in such a manner that the outdoor units (2A, 2B) are arranged in parallel with each other. Three user units (3, 3, 3) are each connected at an end thereof to the main liquid line (4L) and each connected to the main high-pressure gas line (4H) and the main low-pressure gas line (4W) so as to be switchable between the gas lines (4H, 4W).

17 Claims, 17 Drawing Sheets

REFRIGERATION APPARATUS

TECHNICAL FIELD

This invention relates to a refrigeration apparatus which has a plurality of thermal source units and which is capable of performing a cooling operation and a heating operation at the same time.

BACKGROUND ART

Conventionally, there has been known a multi-type air conditioner as a refrigeration apparatus in which a plurality of indoor units are connected to a single outdoor unit through refrigerant piping so as to be arranged in parallel with one another, as disclosed in the Japanese Patent Application Laid Open Gazette No. 3-186157. The outdoor unit has a compressor, a four-way selector valve, two outdoor heat exchangers, an outdoor motor-operated expansion valve and a receiver. The indoor unit has an indoor motor-operated expansion valve and an indoor heat exchanger. The outdoor heat exchangers are each connected at an end thereof to the discharge and inlet sides of the compressor through the four-way selector valve so as to be switchable between the two sides of the compressor by the four-way selector valve. The outdoor heat exchangers is each connected at the other end to a liquid line. The liquid line is connected to an end of the indoor heat exchanger. The discharge side and the inlet side of the compressor are connected to a high-pressure gas line and a low-pressure gas line, respectively. The high-pressure and low-pressure gas lines are connected to the other end of the indoor hear exchanger so as to be switchable therebetween.

At a cooling operation, refrigerant discharged from the compressor is circulated, in such a manner as to be condensed at the outdoor heat exchanger, reduced in pressure at the indoor motor-operated expansion valve, evaporated at the indoor heat exchanger and then returned to the compressor. At a heating operation, refrigerant discharged form the compressor is circulated, in such a manner as to be condensed at the indoor heat exchanger, reduced in pressure at the outdoor motor-operated expansion valve, evaporated at the outdoor heat exchanger and then returned to the compressor.

When the indoor units perform a cooling operation and a heating operation at the same time, for example, when two indoor units perform cooling operations and the other two indoor units perform heating operations, one of the outdoor heat exchangers serves as a condenser according to an indoor load and the other outdoor heat exchanger serves as an evaporator.

PROBLEMS THAT THE INVENTION IS TO SOLVE

In the above-mentioned air conditioner, since only a single outdoor unit is provided, it is required that many kinds of outdoor units having different capacities from one another are produced in accordance with the indoor load, i.e., the number of indoor units to be connected. In addition, when the indoor load does not accord with the capacity of the outdoor unit, the capacity of the outdoor unit is disadvantageously increased in spite of the small indoor load.

Further, since only a single outdoor unit is provided, a refrigerant circuit of the outdoor unit must be formed in a circuit which can perform a cooling operation and a heating operation at the same time and an exclusive outdoor unit for the simultaneous cooling and heating operation must be produced. That is, a plurality of outdoor heat exchangers must be provided and refrigerant piping must be arranged through the four-way selector valve so that the outdoor heat exchangers serve as a condenser or an evaporator individually.

Therefore, there cannot be applied for the above air conditioner a normal outdoor unit which can perform a cooling operation and a heating operation individually by switching between the cooling and heating operations, so that many kinds of outdoor units must be produced according to the uses of the indoor units.

In view of the foregoing problems, the present invention has been made. The present invention has its object of forming a system for performing a cooling operation and a heating operation at the same time by using a normal thermal source unit.

DISCLOSURE OF INVENTION

To attain the above object, a refrigeration apparatus of the present invention is so composed that a plurality of thermal source units are connected to a main liquid line, a main high-pressure gas line and a main low-pressure gas line so as to be arranged in parallel with one another.

CONSTRUCTION

In detail, as shown in FIG. 1, a refrigeration apparatus of claim 1 of the present invention comprises a plurality of thermal source units (2A, 2B) each of which has a compressor (21), a thermal-source-side heat exchanger (24) which is connected at an end thereof to the discharge side and the inlet side of the compressor (21) so as to be switchable between the sides of the compressor (21) and connected at the other end to each of liquid lines (5A, 5B), and a thermal-source-side expansion mechanism (25) disposed on each of the liquid lines (5A, 5B), and in which base ends of gas lines (6A, 6B) are each connected to the discharge and inlet sides of the compressor (21) so as to be switchable between the sides of the compressor (21). Each of the gas lines (6A, 6B) is branched to a high-pressure passage (65, 66) for allowing a refrigerant to flow in the discharge direction of the compressor (21) and a low-pressure passage (67, 68) for allowing a refrigerant to flow in the inlet direction of the compressor (21). The refrigeration apparatus further comprises a main liquid line (4L) connected to the liquid lines (5A, 5B) so that the thermal source units (2A, 2B) are arranged in parallel with one another, a main high-pressure gas line (4H) connected to all the high-pressure passages (65, 66) so that the thermal source units (2A, 2B) are arranged in parallel with one another, a main low-pressure gas line (4W) connected to all the low-pressure passage (67, 68) so that the thermal source units (2A, 2B) are arranged in parallel with one another. In addition, the refrigeration apparatus further comprises a plurality of user units (3, 3 . . . .) which has a user-side heat exchanger (32) connected at an end thereof to the main liquid line (4L), a user-side expansion mechanism (33) disposed between the user-side heat exchanger (33) and the main liquid line (4L), and in which the other end of the user-side heat exchanger (32) is connected to the main high-pressure gas line (4H) and the main low-pressure gas line (4W) so as to be switchable between the gas lines (4H, 4W).

A refrigeration apparatus of claim 2 according to claim 1 further comprises: non-return valves (V1, V2) disposed in the respective high-pressure passages (65, 66) for allowing a refrigerant to flow from the thermal source units (2A, 2B) to the main high-pressure gas line (4H); and non-return valves (V3, V4) disposed in the respective low-pressure passages (66, 67) for allowing a refrigerant to flow from the main low-pressure gas line (4W) to the thermal source units (2A, 2B).

A refrigeration apparatus of claim 3 according to claim 1 further comprises switching means (V8–V10) for switching a flowing direction of a refrigerant by opening and closing the high-pressure passages (65, 66) and the low-pressure passages (67, 68) so that the refrigerant flows through the high-pressure passages (65, 66) from the thermal source units (2A, 2B) to the main high-pressure gas line (4H) and flows through the low-pressure passages (67, 68) from the main low-pressure gas line (4W) to the thermal source units (2A, 2B).

In a refrigeration apparatus of claim 4 according to claim 1, the liquid lines (5A, 5B) are so composed that respective liquid passages (53, 54) thereof are connected to outer ends of respective liquid pipes (51, 52) thereof extending outward from the thermal source units (2A, 2B), the gas lines (6A, 6B) are so composed that respective gas passages (63, 64) thereof each having the high-pressure passage (65, 66) and the low-pressure passage (67, 68) are connected to outer ends of respective gas pipes (61, 62) thereof extending outward from the thermal source units (2A, 2B), the main liquid line (4L) is so composed that a main liquid passage (41b) is connected to an end of a main liquid pipe (41a) extending at the other end thereof to the user-side heat exchanger (32), the main high-pressure gas line (4H) is so composed that a main high-pressure gas passage (42b) is connected to an end of a main high-pressure gas pipe (42a) extending at the other end thereof to the user-side heat exchanger (32), and the main low-pressure gas line (4W) is so composed that a main low-pressure gas passage (43b) is connected to an end of a main low-pressure gas pipe (43a) extending at the other end thereof to the user-side heat exchanger (32). Further, the liquid passages (53, 54), the high-pressure passages (65, 66) and the low-pressure passages (67, 68) are connected to the main liquid passage (41b), the main high-pressure gas passage (42b) and the main low-pressure gas passage (43b), respectively, and the liquid passages (53, 54), the gas passages (63, 64), the main liquid passage (41b), the main high-pressure gas passage (42b) and the main low-pressure gas passage (43b) are unitized to form a piping unit (11).

As shown in FIG. 6, a refrigeration apparatus of claim 5 comprises, in addition to the construction of claim 1, an auxiliary gas line (8a) having a high-pressure auxiliary passage (83) for allowing a refrigerant to flow from the thermal source unit (2A) to the main high-pressure gas line (4H) and a low-pressure auxiliary passage (84) for allowing a refrigerant to flow from the main low-pressure gas line (4W) to the thermal source unit (2A). The high-pressure auxiliary passage (83) is connected at an end thereof to a gas-refrigerant pipe (26) in which a gas refrigerant flows from and to the thermal-source-side heat exchanger (24) of one of the thermal source units (2A) and connected at the other end thereof to the main high-pressure gas line (4H). The low-pressure auxiliary passage (84) is connected at an end thereof to the gas-refrigerant pipe (26) of the thermal-source-side heat exchanger (24) of one of the thermal source units (2A) and connected at the other end thereof to the main low-pressure gas line (4W).

As shown in FIG. 10, a refrigeration apparatus of claim 7 comprises, instead of the auxiliary gas line (8a) in claim 5, an auxiliary gas line (8a) having a high-pressure auxiliary passage (83) for allowing a refrigerant to flow in both directions between the thermal source unit (2A) and the main high-pressure gas line (4H) and a low-pressure auxiliary passage (84) for allowing a refrigerant to flow in both directions between the main low-pressure gas line (4W) and the thermal source unit (2A). The high-pressure auxiliary passage (83) is connected at an end thereof to a gas-refrigerant pipe (26) in which a gas refrigerant flows from and to the thermal-source-side heat exchanger (24) of one of the thermal source units (2A) and connected at the other end thereof to the main high-pressure gas line (4H). The low-pressure auxiliary passage (84) is connected at an end thereof to the gas-refrigerant pipe (26) of the thermal-source-side heat exchanger (24) of one of the thermal source units (2A) and connected at the other end thereof to the main low-pressure gas line (4W).

In a refrigeration apparatus of claim 6 according to claim 5 and a refrigeration apparatus of claim 8 according to claim 7, a piping unit (11) is composed in the same manner as in claim 4. In each of the refrigeration apparatus, the auxiliary gas line (8a) is so composed that an auxiliary gas pipe (81) extending outward from the thermal source unit (2A) is connected at an outer end thereof to an auxiliary gas passage (82) having the high-pressure auxiliary passage (83) and the low-pressure auxiliary passage (84). The liquid passages (53, 54) are connected to the main liquid passage (41b), the high-pressure passages (65, 66) and the high-pressure auxiliary passage (83) are connected to the main high-pressure gas passage (42b), and the low-pressure passages (67, 68) and the low-pressure auxiliary passage (84) are connected to the main low-pressure gas passage (43b). The liquid passages (53, 54), the gas passages (63, 64), the main liquid passage (41b), the main high-pressure gas passage (42b), the main low-pressure gas passage (43b) and the auxiliary gas passage (82) are unitized to form a piping unit (11).

A refrigeration apparatus of claim 9 comprises, in addition of the construction of claim 1, an equalization passage (8c) which is connected between the main high-pressure gas line (4H) and the main low-pressure gas line (4W) and which has an equalizing and closing mechanism (V17) for allowing and preventing a flow of refrigerant from the main high-pressure gas line (4H) to the main low-pressure gas line (4W).

In a refrigeration apparatus of claim 10 according to claim 9, a piping unit (11) is composed in the same manner as in claim 4. In the refrigeration apparatus, the liquid passages (53, 54) are connected to the main liquid passage (41b), the high-pressure passages (65, 66) are connected to the main high-pressure gas passage (42b), the low-pressure passages (67, 68) are connected to the main low-pressure gas passage (43b), and the equalization passage (8c) is connected to the main high-pressure gas passage (42b) and the main low-pressure gas passage (43b). The liquid passages (53, 54), the gas passages (63, 64), the main liquid passage (41b), the main high-pressure gas passage (42b), the main low-pressure gas passage (43b) and the equalization passage (8c) are unitized to form a piping unit (11).

As shown in FIG. 12, a refrigeration apparatus of claim 11 according to claim 5 further comprises an equalization passage (8c) as in claim 9 and an auxiliary closing mechanism (V18) disposed on the auxiliary gas line (8a) for allowing and preventing a flow of refrigerant.

As shown in FIG. 14, a refrigeration apparatus of claim 12 according to claim 7 further comprises an equalization passage (8c) as in claim 9.

A refrigeration apparatus of claim 13 according to any of claim 1 to claim 12 further comprises a gas common line (8d) which is communicated with the gas-refrigerant pipes (26) of the thermal-source-side heat exchangers (24) of all the thermal source units (2A, 2B) and which has a closing mechanism (V19) for allowing a flow of refrigerant when all the thermal source units (2A, 2B) are in the same refrigerating cycles.

As shown in FIG. 15 and FIG. 17, a refrigeration apparatus of claim 14 according to any of claim 1 to claim 12 further comprises: a gas common line (8d) which establishes communications between the gas-refrigerant pipe (26) of the thermal-source-side heat exchanger (24) of one thermal source unit (2A) and the gas-refrigerant pipe (26) of the thermal-source-side heat exchanger (24) of another thermal source unit (2B) and has a first closing mechanism (V19) for allowing a refrigerant to flow in both directions between the gas-refrigerant pipes (26); and a branch common passage (8e) which is communicated at an end thereof with the gas line (6A) of the former thermal source unit (2A), communicated at the other end thereof with the gas common line (8d) so as to connected between the latter thermal source unit (2B) and the first closing mechanism (V19) and provided with a second closing mechanism (V20) for allowing a refrigerant to flow in both directions between the gas line (6A) and the gas common line (8d).

A refrigeration apparatus of claim 15 according to any of claim 1 to claim 12 further comprises a receiver (12) which is disposed at a connecting part between the main liquid line (4L) and the liquid lines (5A, 5B) extending from the thermal source units (2A, 2B) and connects the liquid lines (5A, 5B) to the main liquid line (4L).

A refrigeration apparatus of claim 16 according to any of claim 1 to claim 12 further comprises a liquid-line closing mechanism (V13) which is disposed on the liquid line (5B) of one of the thermal source units (2B) so as to be in the proximity of a connecting part between the liquid line (5B) and the main liquid line (4L) and fully closes when the thermal source unit (2B) is deactivated during refrigerating operation.

In a refrigeration apparatus of claim 17 according to any of claim 1 to claim 12, a refrigerant recovering passage (8b) having a recovery closing mechanism (V14) which opens when one thermal source unit (2B) is deactivated during refrigerating operation is connected between the main low-pressure gas line (4W) and a portion of the gas line (6B) which is located on the thermal source unit's (2B) side of the high-pressure passage (66) and the low-pressure passage (68).

OPERATION

According to the refrigeration apparatus of claims 1–4, when a cooling operation is performed to each of the user units (3, 3 . . . .), each of the thermal source units (2A, 2B) turns a cooling cycle. High-pressure gas refrigerants discharged from the compressors (21) of the thermal source units (2A, 2B) are each condensed at the thermal-source-side heat exchanger (24) to turn a liquid refrigerant. The plural flows of liquid refrigerants are collected on the main liquid line (4L) of the piping unit (11). Then, the liquid refrigerant is distributed to the user units (3, 3, . . .). In each of the user units (3, 3, . . .), the liquid refrigerant is reduced in pressure at the user-side expansion mechanism (33), and then evaporated at the user-side heat exchanger (32) to turn a low-pressure gas refrigerant. The gas refrigerant flows through the main low-pressure gas line (4W) and is distributed at the piping unit (11) to the low-pressure passages (67, 68). The gas refrigerant is each returned to the compressor (21) of each of the thermal source units (2A, 2B) from the gas lines (6A, 6B), via the non-return valves (V1–V4) in the refrigeration apparatus of claim 2 or via the switching means (VS–V10) in the refrigeration apparatus of claim 3. The cooling operation is performed by repeating the above circulating process.

When a heating operation is performed to each of the user units (3, 3 . . . .), each of the thermal source units (2A, 2B) turns a heating cycle. High-pressure gas refrigerants discharged from the compressors (21) of the thermal source units (2A, 2B) flow through the gas lines (6A, 6B) and the high-pressure gas passages (65, 66) of the piping unit (11), and are collected to the main high-pressure gas line (4H) via the non-return valves (V1–V4) or the switching means (V8–V10). Then, the collected gas refrigerant is distributed to the user units (3, 3 . . . .). In each of the user units (3, 3 . . . .), the gas refrigerant is condensed at the user-side heat exchanger (32) to turn a liquid refrigerant. The liquid refrigerant flows through the main liquid line (4L) and is distributed at the piping unit (11) to the liquid passages (53, 54) extending to the thermal source units (2A, 2B). Then, each of the liquid refrigerants is reduced in pressure at the thermal-source-side expansion mechanism (25) and evaporated at the thermal-source-side heat exchanger (24) to turn a low-pressure gas refrigerant. The gas refrigerant is returned to the compressor (21) of each of the user units (3, 3 . . . .). The heating operation is performed by repeating the above circulating process.

When a heating operation is performed to one user unit (3) during the above cooling operation, the cooling and heating are performed at the same time. In this simultaneous cooling and heating operation, one thermal source unit (2A) is in a cooling cycle and the other thermal source unit (2B) turns a heating cycle. The high-pressure gas refrigerant discharged from the compressor (21) of the former thermal source unit (2A) is condensed at the thermal-source-side heat exchanger (24) to turn a liquid refrigerant. The liquid refrigerant flows into the piping unit (11). A part or all of the liquid refrigerant flows toward the latter thermal source unit (2B), reduced in pressure, evaporated at the thermal-source-side heat exchanger (24) and compressed at the compressor (21). Then, the high-pressure refrigerant discharged from the compressor (21) flows through the gas line (6B), and flows through the main high-pressure gas line (4H) via the non-return valves (V1–V4) or the switching means (V5–V10) at the piping unit (11), as in the above heating operation. Then, the gas refrigerant flows into the user units (3) in heating operation.

Next, the gas refrigerant is condensed at the user units (3) in heating operation to turn a liquid refrigerant. The liquid refrigerant flows through the main liquid line (4H), and flows into the indoor units (3, 3, . . .) in cooling operation as in the above cooling operation.

Then, the liquid refrigerant is evaporated to turn a low-pressure gas refrigerant at each of the user units (3, 3, . . .) in cooling operation, flows through the main low-pressure gas line (4W) and is returned to the compressor (21) of the thermal source unit (2A) in a cooling cycle. The simultaneous cooling and heating operation is made by repeating the above circulating process.

According to the refrigeration apparatus of claims 5, 6, 16 and 17, the following operation is added to the operations in claims 1–4. That is, when cooling performance is required high at the simultaneous cooling and heating operation, each of the thermal source units (2A, 2B) turns a cooling cycle. The gas refrigerants discharged from the compressors (21) of the thermal source units (2A, 2B) are condensed at the thermal-source-side heat exchangers (24) to turn liquid refrigerants, respectively. Most of the liquid refrigerants are collected to and flows into the main liquid line (4L).

A part of the high-pressure gas refrigerant discharged from the compressor (21) of one thermal source unit (2A) flows into the auxiliary gas line (8a) and the main high-pressure gas line (4H) in order, and then enters the user units (3, 3 . . . .) in heating operation. In the user units (3, 3, . . .), the high-pressure gas refrigerant is condensed to turn a liquid refrigerant. The liquid refrigerant meets the liquid refrigerants flowing from the plural thermal source units (2A, 2B) at the main liquid line (4L) and flows into the user units (3, 3 . . . .) in cooling operation. In each of the user units (3, 3 . . . .), the liquid refrigerant is evaporated to turn a low-pressure gas refrigerant. The gas refrigerants from the user units (3, 3 . . . .) flow through the main low-pressure gas line (4W) and are returned to the compressors (21) of the thermal source units (2A, 2B). The simultaneous cooling and heating operation is made by repeating the above circulating process.

When one thermal source unit (2B) is deactivated during operation, the liquid-line closing mechanism (V13) is closed to prevent the liquid refrigerant from being stored in a receiver and the like. In detail, because the pressure of liquid refrigerant during operation is higher than a saturation pressure according to an open-air temperature, the liquid refrigerant may be stored in the receiver and the like. In this refrigeration apparatus, the storage of the liquid refrigerant can be prevented.

Further, when the above thermal source unit (2B) is deactivated during operation, the gas passage (64) of the thermal source unit (2B) is communicated with the main low-pressure gas line (4W), thereby preventing the liquid refrigerant from being stored in the thermal source unit (2B).

In the refrigeration apparatus of claims 7, 8, 18 and 17, the following operation is added to the above-mentioned operation according to claims 5, 6, 16 and 17. When one thermal source unit (2A) is in a heating cycle and the other thermal source unit (2B) is in a cooling operation, the auxiliary gas line (8a) equalizes the pressures of the low-pressure refrigerants of both the thermal source units (2A, 2B). The pressure of the low-pressure refrigerant of one of the thermal source unit (2B) which is an important factor in a cooling cycle is detected by a low-pressure sensor for detecting a low pressure which is disposed in the other thermal source unit (2A).

When one thermal source unit (2A) is in a cooling cycle and the other thermal source unit (2B) is in a heating cycle, the auxiliary gas line (8a) equalizes the pressures of the high-pressure refrigerants of both the thermal source units (2A, 2B). The pressure of the high-pressure refrigerant of one of the thermal source unit (2B) is detected by a high-pressure sensor for detecting a high pressure which is disposed in the other thermal source unit (2A).

In the refrigeration apparatus of claims 9–12, the following operation is added to the operation according to claims 1–4. When the main low-pressure gas line (4W) is equalized in pressure with the main high-pressure gas line (4H), one thermal source unit (2A) is turned to a heating cycle, the other thermal source unit (2B) is deactivated and communications are established in the equalization passage (8c). Under this conditions, a high-pressure gas refrigerant discharged from the compressor (21) of the thermal source unit (2A) flows through the gas line (6A), the main high-pressure gas line (4H) and the equalization passage (8c) in order, and flows into the main low-pressure gas line (4W), so that the main low-pressure gas line (4W) is equalized under high pressure.

On the contrary, when the main high-pressure gas line (4H) is equalized in pressure with the main low-pressure gas line (4W), both the thermal source units (2A, 2B) are deactivated and communications are established in the equalization passage (8c). Under this conditions, a high-pressure gas refrigerant of the main high-pressure gas line (4H) flows into the main low-pressure gas line (4W), so that the main high-pressure gas line (4H) is equalized under low pressure.

In the refrigeration apparatus of claim 13, the following operation is added to the operation in claim 1. When all the thermal source units (2A, 2B) are operated in the same cycle, the gas-refrigerant pipes (26) of the thermal-source-side heat exchangers (24) of all the thermal source units (2A, 2B) are communicated with one another through the gas common passage (85). Accordingly, amounts of refrigerants which flow through the respective thermal-source-side heat exchangers (24) of the thermal source units (2A, 2B) are approximately equal to one another, thereby increasing a coefficient of performance (COP) of the refrigeration apparatus.

In the refrigeration apparatus of claim 14, the following operation is added to the operation in claim 1. Since the gas-refrigerant pipes (26) of the thermal-source-side heat exchangers (24) of all the thermal source units (2A, 2B) are communicated with one another through the gas common passage (85) or the branch common passage (8e), the high-pressure refrigerants on the discharge sides of the compressors (21) of all the thermal source units (2A, 2B) are equalized in pressure to one another, and the low-pressure refrigerants on the inlet sides of the compressors (21) of all the thermal source units (2A, 2B) are equalized in pressure to one another. Accordingly, a single high-pressure sensor for detecting a high pressure and/or a single low-pressure sensor for detecting a low pressure can be shared among all the thermal source units (2A, 2B).

In the refrigeration apparatus of claim 15, the liquid refrigerant is collected and divided at the receiver (12).

EFFECTS

In the refrigeration apparatus of claims 1–3, since there are provided a plurality of thermal source units (2A, 2B), a particular thermal source unit corresponding to the simultaneous cooling and heating operation is not necessary and a plurality of normal thermal source units (2A, 2B) can correspond to several kinds of uses.

In particular, since each of the thermal source units (2A, 2B) has a simple structure that the liquid line (5A, 5B) and the gas line (6A, 6B) extend from the thermal source unit (2A, 2B), the thermal source units (2A, 2B) can be applied as normal thermal source units in which the simultaneous cooling and heating operation is not performed. This allows a few kinds of thermal source units to perform several kinds of operations, thereby increasing general versatility of the thermal source units (2A, 2B).

Further, since a plurality of thermal source units (2A, 2B) having different capacities from one another can be produced and combined, this enables a few kinds of thermal source units (2A, 2B) to correspond to a plurality of indoor units (3, 3 . . . .), i.e., many kinds of indoor loads.

In the refrigeration apparatus of claim 5, since there is provided an auxiliary gas line (8a), a simultaneous cooling and heating operation can be performed, in addition to the case that both cooling and heating performances are required at the same level, in the case that cooling performance is required high, in the case that heating performance is required high, and in the case that both cooling and heating performances are required low. This results in increasing the extent of operation of the refrigeration apparatus, so that the refrigeration apparatus can correspond to various kinds of states of use.

Further, since there is provided the auxiliary gas line (8a), this allows only the compressor (21) of one thermal source unit (2A) to be controlled in capacity so as to be changed approximately in a linear proportion to an indoor load by an inverter circuit and allows the compressor (21) of the other thermal source unit (2B) to be controlled in capacity so as to be switched among three steps by unloading control, thereby increasing the extent of operation of the refrigeration apparatus as mentioned above. Thus, the refrigeration apparatus can cope with various kinds of states of use by a simple control mechanism.

According to the refrigeration apparatus of claim 7, since a high-pressure sensor and a low-pressure sensor can be provided only in one thermal source unit (2A), sensors of the other thermal source unit (2B) can be dispensed with. This reduces the number of elements without lowering accuracy of controlling the thermal source units (2A, 2B).

In the refrigeration apparatus of claims 9, 11 and 12, since there is provided an equalization passage (8c), the main high-pressure gas line (4H) and the main low-pressure gas line (4W) are equalized in pressure when the user unit (3) is switched between a cooling operation and a heating operation. This securely prevents generation of vibrations and noises resulting from the switching of operation.

According to the refrigeration apparatus of claims 4, 6, 8 and 10, since the piping connection between the liquid lines (5A, 5B) and the main liquid line (4L) is formed into the piping unit (11), an angle of tilt required for backing oil can be secured and a part of piping to be horizontally arranged can be securely held in a horizontal position. Accordingly, oil backing can be secured and a flash of liquid refrigerant can be prevented. This enables high-reliable air conditioning.

According to the refrigeration apparatus of claim 13, when all the thermal source units (2A, 2B) are operated in the same cycle, the gas-refrigerant pipes (26) of the thermal-source-side heat exchangers (24) of all the thermal source units (2A, 2B) are communicated with one another. Accordingly, amounts of refrigerants which flow through the respective thermal-source-side heat exchangers (24) of the thermal source units (2A, 2B) are approximately equal to one another, thereby increasing a coefficient of performance (COP) of the refrigeration apparatus.

According to the refrigeration apparatus of claim 14, since the gas-refrigerant pipes (26) of the thermal-source-side heat exchangers (24) of all the thermal source units (2A, 2B) are communicated with one another, the high-pressure refrigerants on the discharge sides of the compressors (21) of all the thermal source units (2A, 2B) can be equalized in pressure to one another, and the low-pressure refrigerants on the inlet sides of the compressors (21) of all the thermal source units (2A, 2B) can be equalized in pressure to one another. Accordingly, a single high-pressure sensor and/or a single low-pressure sensor can be shared between all the thermal source units (2A, 2B). This results in reducing the number of elements.

According to the refrigeration apparatus of claim 15, since provision of the single receiver (12) can dispense with respective receivers in the thermal source units (2A, 2B), this reduces the number of elements. Further, since a liquid refrigerant is securely distributed, an unbalanced flow of refrigerant is securely prevented even when a flash of gas flows into the liquid lines (5A, 5B) and the like.

In the refrigeration apparatus of claim 16, there is provided a liquid-line closing mechanism (V13) on the liquid line (5B) of one thermal source unit (2B). Since the liquid-line closing mechanism (V13) is closed when the thermal source unit (2B) is deactivated during cooling operation or heating operation, this prevents the liquid refrigerant from being stored in the receiver and the like.

In the refrigeration apparatus of claim 17, since there is provided a refrigerant recovering passage (8b), the gas passage (64) of one thermal source unit (2B) is communicated with the main low-pressure gas line (4W) when the thermal source unit (2B) is deactivated during operation, thereby preventing the liquid refrigerant from being stored in the thermal source unit (2B).

BEST MODE FOR CARRYING OUT THE INVENTION

Detailed description is made below about examples of the present invention, with reference to the drawings.

EXAMPLE 1

Figure 1:
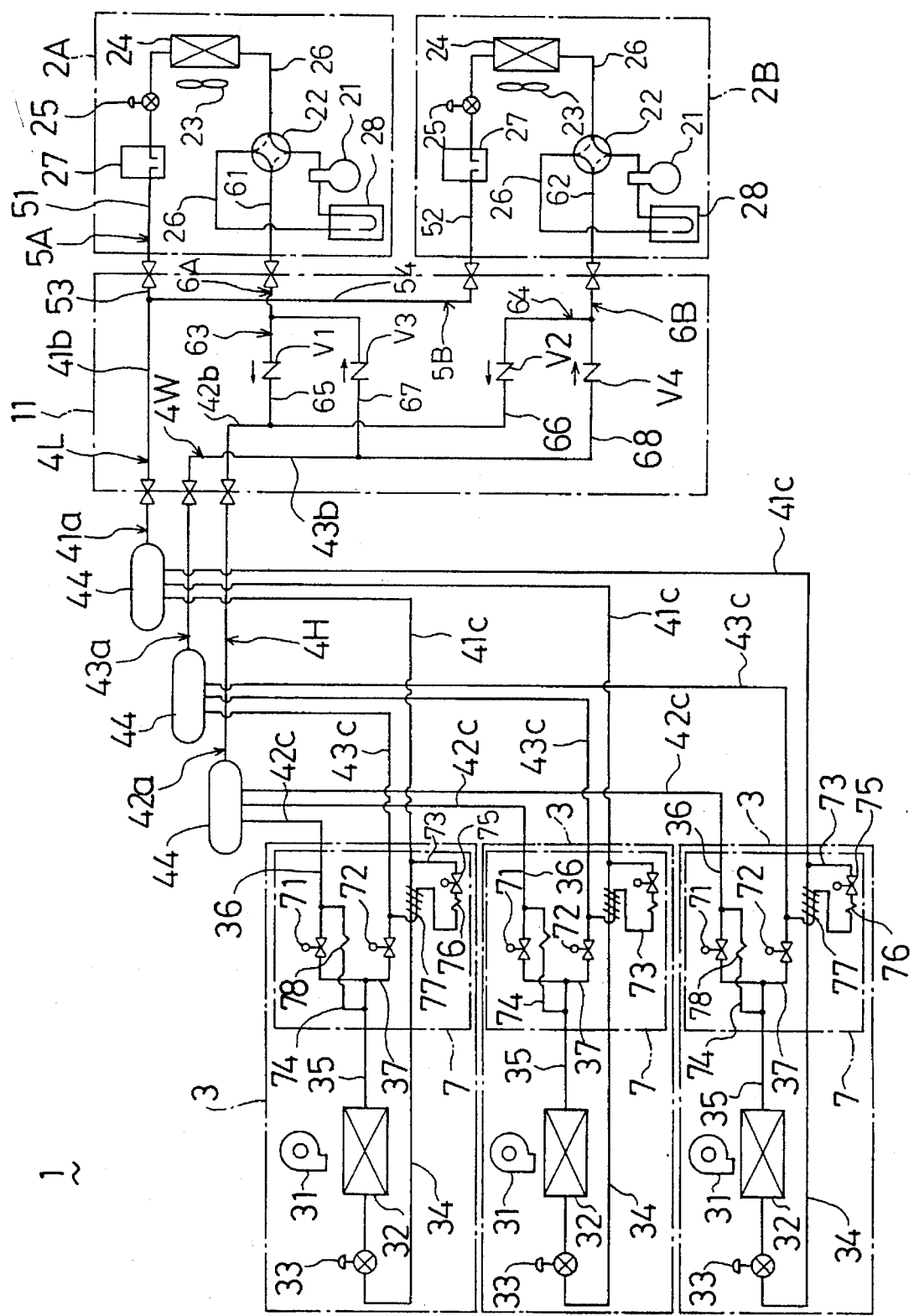
FIG. 1 is a refrigerant circuit diagram of an air conditioner showing Example 1 of the present invention.

FIG. 1 shows an example of a refrigeration apparatus according to claims 1, 2 and 4 of the present invention. Reference numeral (1) indicates an air conditioner as a refrigeration apparatus. In the air conditioner (1), two outdoor units (2A, 2B) are connected to a main liquid line (4L), a main high-pressure gas line (4H) and a main low-pressure gas line (4W) so as to be arranged in parallel with each other, and a plurality of indoor units (3, 3 . . . .) are connected to the main liquid line (4L), the main high-pressure gas line (4H) and the main low-pressure gas line (4W) so as to be arranged in parallel with one another.

Each of the outdoor units (2A, 2B) as thermal source units has a compressor (21), a four-way selector valve. (22), an outdoor heat exchanger (24) as a thermal-source-side heat exchanger which is in the proximity of an outdoor fan (23), and an outdoor motor-operated expansion valve (25) as a thermal-source-side expansion mechanism. An end of the outdoor heat exchanger (24) in which gas flows is connected to a gas-refrigerant pipe (26) and the other end thereof in which liquid flows is connected to a liquid line (5A, 5B).

The gas-refrigerant pipe (26) is connected to the discharge side and the inlet side of the compressor (21) via the four-way selector valve (22) which switchably selects the discharge and inlet sides of the compressor (21). The liquid line (5A, 5B) extending from the outdoor heat exchanger (24) is connected to the main liquid line (4L) via the outdoor motor-operated expansion valve (25) and a receiver (27) for storing liquid refrigerants in order.

Further, the compressor (21) is connected to a gas line (6A, 6B) via the gas-refrigerant pipe (26). The gas line (6A, 6B) is connected to the discharge side and the inlet side of the compressor (21) via the four-way selector valve (22) which switchably selects the discharge and inlet sides of the compressor (21), and also connected to the main high-pressure gas line (4H) and the main low-pressure gas line (4W). An accumulator (28) is provided in the middle of the gas-refrigerant pipe (26) which is located between the inlet side of the compressor (21) and the four-way selector valve (22).

Each of the indoor units (3, 3 . . . .) as user units has an indoor heat exchanger (32) as a user-side heat exchanger which is in the proximity of an indoor fan (31), and an indoor motor-operated expansion valve (33) as a user-side expansion mechanism. The indoor heat exchanger (32) is connected to the main liquid line (4L) via an indoor liquid pipe (34) and connected to an indoor gas pipe (35). The indoor gas pipe (35) is connected to an indoor high-pressure pipe (36) and an indoor low-pressure pipe (37). The indoor high-pressure pipe (36) is connected to the main high-pressure gas line (4H), and the indoor low-pressure pipe (37) is connected to the main low-pressure gas line (4W). The indoor motor-operated expansion valve (33) is disposed in the indoor liquid pipe (34).

A part of the indoor liquid pipe (34), a part of the indoor gas pipe (35), the indoor high-pressure pipe (36) and the indoor low-pressure pipe (37) are integrally formed into a piping kit (7).

The piping kit (7) has a high-pressure valve (71), a low-pressure valve (72), a low-pressure bypass passage (73) and a high-pressure bypass passage (74). The high-pressure valve (71) and the low-pressure valve (72) are disposed in the indoor high-pressure pipe (36) and the indoor low-pressure pipe (37) respectively, and switches between communications of the indoor heat exchanger (32) with the main high-pressure gas line (4H) and communications thereof with the main low-pressure gas line (4W). The low-pressure valve (72) opens when the indoor heat exchanger (32) operates as an evaporator (in cooling operation). The high-pressure valve (71) opens when the indoor heat exchanger (32) operates as a condenser (in heating operation).

The low-pressure bypass passage (73) is connected to the indoor liquid pipe (34) and the downstream side of the low-pressure valve (72) of the indoor low-pressure pipe (37). A bypass valve (75) and a capillary (76) are disposed in the middle of the low-pressure bypass passage (73). A piping heat exchanger (77) is formed of a part of the low-pressure bypass passage (73) and a part of the indoor liquid pipe (34). The low-pressure bypass passage (73) prevents a flash of liquid refrigerant from flowing out from the indoor heat exchanger (32) during heating operation.

The high-pressure bypass passage (74) is connected to the indoor gas pipe (35) and the upstream side of the high-pressure valve (71) of the indoor high-pressure pipe (36), and has a capillary (78) for regulating a flow rate of refrigerant. The high-pressure bypass passage (74) is so composed that a condensed liquid refrigerant stored in the indoor high-pressure pipe (36) during cooling operation is escaped and flows out from the indoor high-pressure pipe (36).

The two outdoor units (2A, 2B) is one of features of the present invention, and so composed that a first outdoor unit (2A) and a second outdoor unit (2B) are connected in parallel with each other. The capacity of each outdoor unit (2A, 2B) is set according to an indoor load, i.e., the number of indoor units (3, 3 . . . .). The compressor (21) of the first outdoor unit (2A) is so composed that the capacity thereof is set in multi-steps by an inverter circuit, while the compressor (21) of the second outdoor unit (2B) is so composed that the capacity thereof is set switchably among 100%, 50% and 0% by unloading control.

Furthermore, in the first and second outdoor units (2A, 2B), there are disposed various kinds of sensors, that is, a discharge-gas temperature sensor for detecting a temperature of a gas refrigerant discharged from the compressor (21), an inlet-gas temperature sensor for detecting a temperature of a gas refrigerant on the inlet side of the accumulator (28), an outdoor-liquid temperature sensor for detecting a temperature of a liquid refrigerant in the vicinity of the outdoor heat exchanger (24), a high-pressure sensor for detecting a pressure of a gas refrigerant discharged from the compressor (21), a low-pressure sensor for detecting a pressure of a gas refrigerant to be sucked into the compressor (21), and the like, though they are not shown in the drawings.

In each of the indoor units (3, 3 . . . .), there are disposed an indoor-liquid temperature sensor for detecting a temperature of a liquid refrigerant in the vicinity of the indoor heat exchanger (32), an indoor-gas temperature sensor for detecting a temperature of a gas refrigerant in the vicinity of the indoor heat exchanger (32), a room temperature sensor for detecting a room temperature, and the like.

Detection signals from the above sensors are inputted into a controller which is not shown in the drawings, and the controller controls openings of the motor-operated expansion valve (25, 33), the capacity of the compressors (21) and the like, based on the detection signals.

The air conditioner (1) has a piping unit (11) as one of features of the present invention. The piping unit (11) connects the liquid lines (5A, 5B) on the indoor unit's (2A, 2B) side to the main liquid line (4L), and connects the gas lines (6A, 6B) on the indoor unit's (2A, 2B) side to the main high-pressure gas line (4H) and the main low-pressure gas line (4W).

In detail, each of the liquid lines (5A, 5B) is composed of a liquid pipe (51, 52) extending outward from the outdoor unit (2A, 2B) and a liquid passage (53, 54) connecting to an outer end of the liquid pipe (51, 52). The liquid pipe (51, 52) is connected at an inner end thereof to the outdoor heat exchanger (24). The outdoor motor-operated expansion valve (25) and the receiver (27) are disposed in the liquid pipe (51, 52).

Each of the gas lines (6A, 6B) is composed of a gas pipe (61, 62) extending outward from the outdoor unit (2A, 2B) and a gas passage (63, 64) connecting to an outer end of the gas pipe (61, 62). The gas pipe (61, 62) is connected to the compressor (21) via the four-way selector valve (22). Further, the gas passage (63, 64) is branched to a high-pressure passage (65, 66) and a low-pressure passage (67, 68). The high-pressure passage (65, 66) allows a refrigerant to flow in the discharge direction of the compressor (21). In detail, the high-pressure passage (65, 66) has a non-return valve (V1, V2) for allowing a refrigerant to flow from the outdoor unit (2A, 2B) to the main high-pressure gas line (4H). The low-pressure passage (67, 68) allows a refrigerant to flow in the inlet direction of the compressor (21). In detail, the low-pressure passage (67, 68) has a non-return valve (V3, V4) for allowing a refrigerant to flow from the main low-pressure gas line (4W) to the outdoor unit (2A, 2B). Thus, two pipes of the liquid pipe (51, 52) and the gas pipe (61, 62) extend from each of the outdoor units (2A, 2B),. That is, each of the outdoor units (2A, 2B) is not formed into a unit to be exclusively used for a simultaneous cooling and heating operation.

The main liquid line (4L) is composed of a main liquid pipe (41a) extending on the indoor unit's (3, 3 . . . .) side and a main liquid passage (41b) connecting to an end of the main liquid pipe (41a). The main liquid passage (41b) is connected to the liquid passages (53, 54) on the outdoor unit's (2A, 2B) side. The main liquid pipe (41a) is branched to branch liquid passages (41c, 41c . . . .) via a flow divider (44). The branch liquid passages (41c, 41c . . . .) are connected to the indoor liquid pipes (34) of the indoor units (3, 3 . . . .), respectively.

The main high-pressure gas line (4H) is composed of a main high-pressure gas pipe (42a) extending on the indoor unit's (3, 3, . . .) side and a main high-pressure gas passage (42b) connecting to an end of the main high-pressure gas pipe (42a). The main high-pressure gas passage (42b) is connected to the high-pressure passages (65, 66) of the gas lines (6A, 6B) on the outdoor unit's (2A, 2B) side. The main high-pressure gas pipe (42a) is branched to branch high-pressure pipes (42c, 42c . . . .) via a flow divider (44). The branch high-pressure pipes (42c, 42c . . . .) are connected to the indoor high-pressure pipes (36) of the indoor units (3, 3, . . .), respectively.

The main low-pressure gas line (4W) is composed of a main low-pressure gas pipe (43a) extending on the indoor unit's (3, 3 . . . .) side and a main low-pressure gas passage (43b) connecting to an end of the main low-pressure gas pipe (43a). The main low-pressure gas passage (43b) is connected to the low-pressure passages (67, 68) of the gas lines (6A, 6B) on the outdoor unit's (2A, 2B) side. The main low-pressure gas pipe (43a) is branched to branch low-pressure pipes (43c, 43c . . . .) via a flow divider (44). The branch low-pressure pipes (43c, 43c . . . .) are connected to the indoor low-pressure pipes (37) of the indoor units (3, 3, . . .), respectively.

The piping unit (11) is so composed that the liquid passages (53, 54) of the liquid lines (5A, 5B) on the outdoor unit's (2A, 2B) side, the main liquid passage (41b) of the main liquid line (4L), the gas passages (63, 64) of the gas lines (6A, 6B) on the outdoor unit's (2A, 2B) side, the main high-pressure gas passage (42b) of the main high-pressure gas line (4H), and the main low-pressure gas passage (43b) of the main low-pressure gas line (4W) are integrally formed and unitized with the non-return valves (V1–V4).

OPERATION OF EXAMPLE 1

Description is made next about control operations of the above air conditioner (1).

At a cooling operation of each of the indoor units (3, 3 . . . .), the four-way selector valve (22) is switched as shown in solid lines of FIG. 1. Respective high-pressure gas refrigerants discharged from the compressors (21) of both the outdoor units (2A, 2B) are condensed at the outdoor heat exchangers (24) to turn respective liquid refrigerants. The two flows of the liquid refrigerants meet at the main liquid passage (41b) of the piping unit (11). Then, the collected liquid refrigerant is distributed at the flow divider (44) to the indoor units (3, 3, . . .). In each of the indoor units (3, 3 . . . .), the high-pressure valve (71) is closed and the low-pressure valve (72) is opened, so that the liquid refrigerant is reduced in pressure at the indoor motor-operated expansion valve (33) and evaporated at the indoor heat exchanger (32) to turn a low-pressure gas refrigerant. Then, the gas refrigerant flows through the indoor low-pressure pipe (37) and the main low-pressure gas line (4W) in order, and is distributed at the piping unit (11) to the low-pressure passages (67, 68). Next, the distributed gas refrigerants are returned to the compressors (21) of the outdoor units (2A, 2B) via the gas lines (6A, 6B), respectively. The cooling operation is made by repeating above circulating process.

At a heating operation of the indoor units (3, 3, . . .), the four-way selector valve (22) is switched as shown in dash lines of FIG. 1. Respective high-pressure gas refrigerants discharged from the compressors (21) of both the outdoor units (2A, 2B) flow into the piping unit (11) via the respective gas lines (6A, 6B). In the piping unit (11), the respective gas refrigerants flow through the respective high-pressure passages (65, 66) and meet at the main high-pressure gas passage (42b). The collected gas refrigerant is distributed at the flow divider (44) to the indoor units (3, 3, . . .). In each of the indoor units (3, 3, . . .), the high-pressure valve (71) is opened and the low-pressure valve (72) is closed, so that the gas refrigerant flows through the indoor high-pressure pipe (36) and is condensed at the indoor heat exchanger (32) to turn a liquid refrigerant. The liquid refrigerant flows through the main liquid line (4L) and the piping unit (11) in order. In the piping unit (11), the liquid refrigerant flows through the main liquid passage (41b) and is distributed to the liquid passages (53, 54) extending to the outdoor units (2A, 2B). Then, the distributed liquid refrigerants are each reduced in pressure at the outdoor motor-operated expansion valve (25) and evaporated at the outdoor heat exchanger (24) to turn a low-pressure gas refrigerant. Then, the gas refrigerants are returned to the compressors (21) of the outdoor units (2A, 2B). The heating operation is made by repeating the above circulating process.

When all the indoor units (3, 3, . . .) are under cooling operation and then a heating operation is performed to one indoor unit (3) in such a manner that the switching is done between the high-pressure valve (71) and the low-pressure valve (72) in the indoor unit (3), or, on the contrary, when all the indoor units (3, 3, . . .) are under heating operation and then a cooling operation is performed to one indoor unit (3) in such a manner that the switching is done between the high-pressure valve (71) and the low-pressure valve (72) in the indoor unit (3), a simultaneous cooling and heating operation is conducted.

In the simultaneous cooling and heating operation, the four-way selector valve (22) of the first outdoor unit (2A) is switched as shown in solid lines of FIG. 1 so that the first outdoor unit (2A) turns a cooling cycle, and the four-way selector valve (22) of the second outdoor unit (2B) is switched as shown in dash lines of FIG. 1 so that the second outdoor unit (2B) turns a heating cycle. A high-pressure refrigerant discharged from the compressor (21) of the first outdoor unit (2A) is condensed at the outdoor heat exchanger (24) to turn a liquid refrigerant. The liquid refrigerant flow into the piping unit (11). A part or all of the liquid refrigerant flows from the piping unit (11) into the second outdoor unit (2B) via the liquid passage (54). In the second outdoor unit (2B), the refrigerant is reduced in pressure at the outdoor motor-operated expansion valve (25), evaporated at the outdoor heat exchanger (24), and compressed at the compressor (21). Then, a high-pressure gas refrigerant is discharged from the compressor (21) and then flows through the gas line (6B) extending from the second outdoor unit (2B). As in the above heating operation, the refrigerant flows through the main high-pressure gas line (4H) via the piping unit (11) and flows into the indoor units (3, 3, . . .) in heating operation.

Next, the gas refrigerant is condensed at the indoor heat exchanger (32) of the indoor unit (3) in heating operation to turn a liquid refrigerant. The liquid refrigerant flows into the flow divider (44) via the branch liquid pipe (41c) of the main liquid line (4L). When the liquid refrigerant generated from the first outdoor unit (2A) flows through the main liquid line (4L) at the time, the liquid refrigerant from the first outdoor unit (2A) and the liquid refrigerant from the indoor unit (3) in heating operation are collected at the flow divider (44). The collected liquid refrigerant flows through the branch liquid pipe (41c) and, as in the above cooling operation, flows into the indoor units (3, 3, . . .) in cooling operation.

Then, the liquid refrigerant is evaporated in the indoor unit (3) in cooling operation to turn a low-pressure gas refrigerant. The gas refrigerant flows through the main low-pressure gas line (4W) and the low-pressure gas line (6A) of the first outdoor unit (2A) and returns to the compressor (21) of the first outdoor unit (2A). The simultaneous cooling and heating operation is made by repeating the above circulating process.

In the above simultaneous cooling and heating operation, the first outdoor unit (2A) is in a cooling cycle and the second outdoor unit (2B) is in a heating cycle. However, the four-way selector valve (22) of the first outdoor unit (2A) may be switched as shown in dash lines of FIG. 1 so that the first outdoor unit (2A) turns a heating cycle and the four-way selector valve (22) of the second outdoor unit (2B) may be switched as shown in solid lines of FIG. 1 so that the second outdoor unit (2B) turns a cooling cycle. In such a case, a high-pressure gas refrigerant discharged from the compressor (21) of the second outdoor unit (2B) is condensed at the outdoor heat exchanger (24) to turn a liquid refrigerant. A part or all of the liquid refrigerant is evaporated in the first outdoor unit (2A), compressed at the compressor (21) and then flows through the main high-pressure gas line (4H).

EFFECTS OF EXAMPLE 1

According to this example, since there are provided two thermal source units (2A, 2B), a particular thermal source unit corresponding to the simultaneous cooling and heating operation is not necessary and the normal thermal source units (2A, 2B) can correspond to several kinds of uses.

In particular, since each of the outdoor units (2A, 2B) has a simple structure that the liquid line (5A, 5B) and the gas line (6A, 6B) extend from the outdoor unit (2A, 2B), the outdoor units (2A, 2B) can be applied as normal outdoor units in which the simultaneous cooling and heating operation is not performed. This allows a few kinds of outdoor units to perform several kinds of operations, thereby increasing general versatility of the outdoor units (2A, 2B).

Further, since two outdoor units (2A, 2B) having different capacities from one another can be produced and combined, this enables a few kinds of outdoor units (2A, 2B) to correspond to a plurality of indoor units (3, 3, . . .), i.e., many kinds of indoor loads.

Furthermore, since the piping connection between the liquid lines (5A, 5B) and the main liquid line (4L) is formed into the piping unit (11), an angle of tilt required for backing oil can be secured and a part of piping to be horizon-tally arranged can be securely held in a horizontal position. Accordingly, oil backing can be secured and a flash of liquid refrigerant can be prevented. This enables high-reliable air conditioning.

MODIFICATION OF EXAMPLE 1

Figure 2:
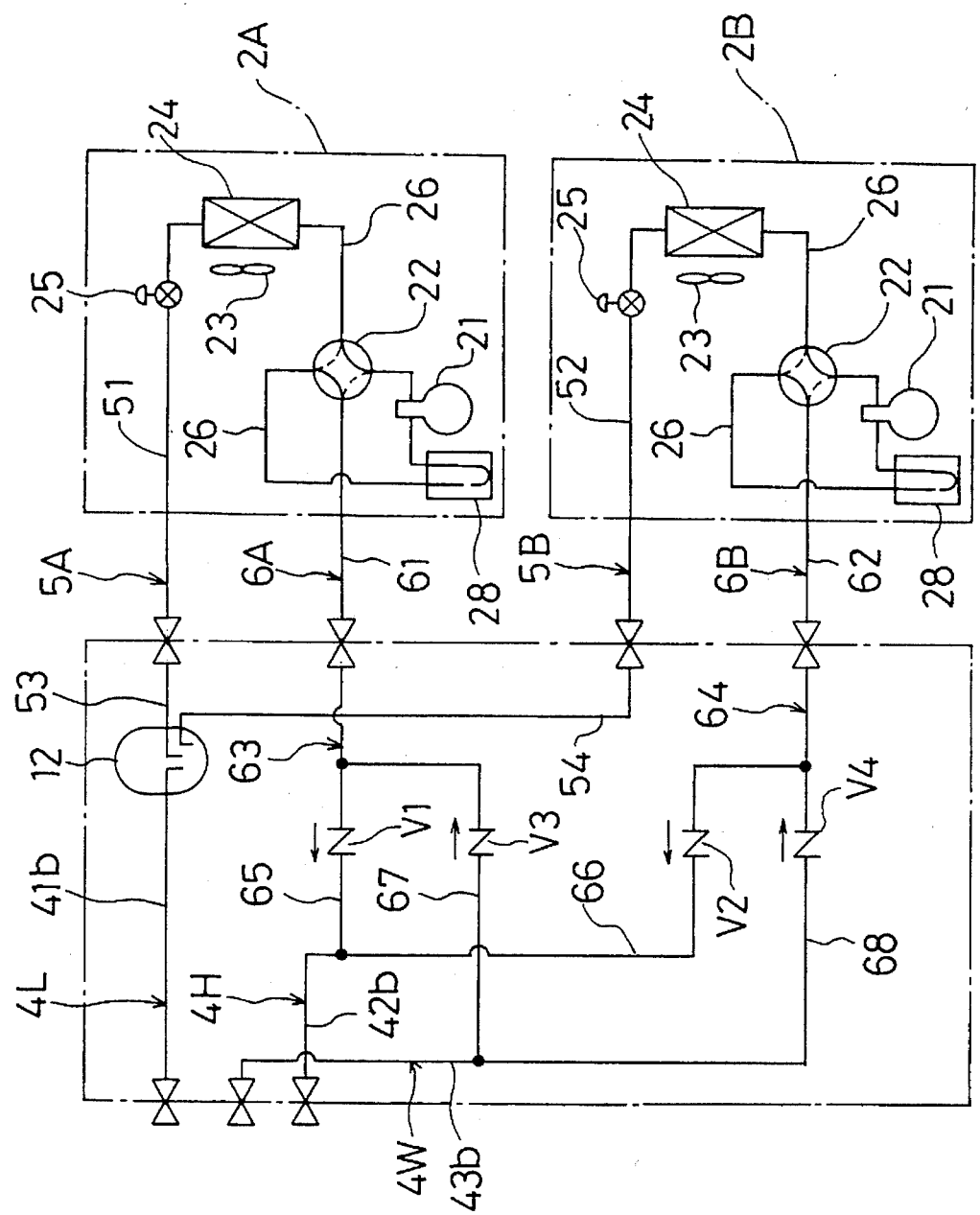
FIG. 2 is a refrigerant circuit diagram showing a main part of a modification of Example 1.

FIG. 2 shows a modification of the above example of FIG. 1 and an example of a refrigeration apparatus according to claim 15 of the present invention. A single receiver (12) is provided in the piping unit (11). The receiver (12) is disposed at a connecting part between the main liquid passage (41b) and the liquid passages (53, 54) running to the outdoor units (2A, 2B). The receiver (12) stores liquid refrigerants, collects liquid refrigerants from the outdoor units (2A, 2B) to the main liquid line (4L) at a cooling operation, distributes a liquid refrigerant from the main liquid line (4L) to the outdoor units (2A, 2B) at a heating operation, and sends a liquid refrigerant from the first outdoor unit (2A) to the second outdoor unit (2B) at a simultaneous cooling and heating operation. In this case, the receivers (27) of the outdoor units (2A, 2B) as shown in FIG. 1 are dispensed with.

According to this example, since provision of the single receiver (12) can dispense with respective receivers of the outdoor units (2A, 2B), this reduces the number of elements.

Further, since distribution of a liquid refrigerant is securely carried out, an unbalanced flow of refrigerant can be securely prevented even when a flash of gas flows into the main liquid line (4L) or the like.

Other constructions, operations and effects are the same as in Example 1 shown in FIG. 1.

EXAMPLE 2

Figure 3:
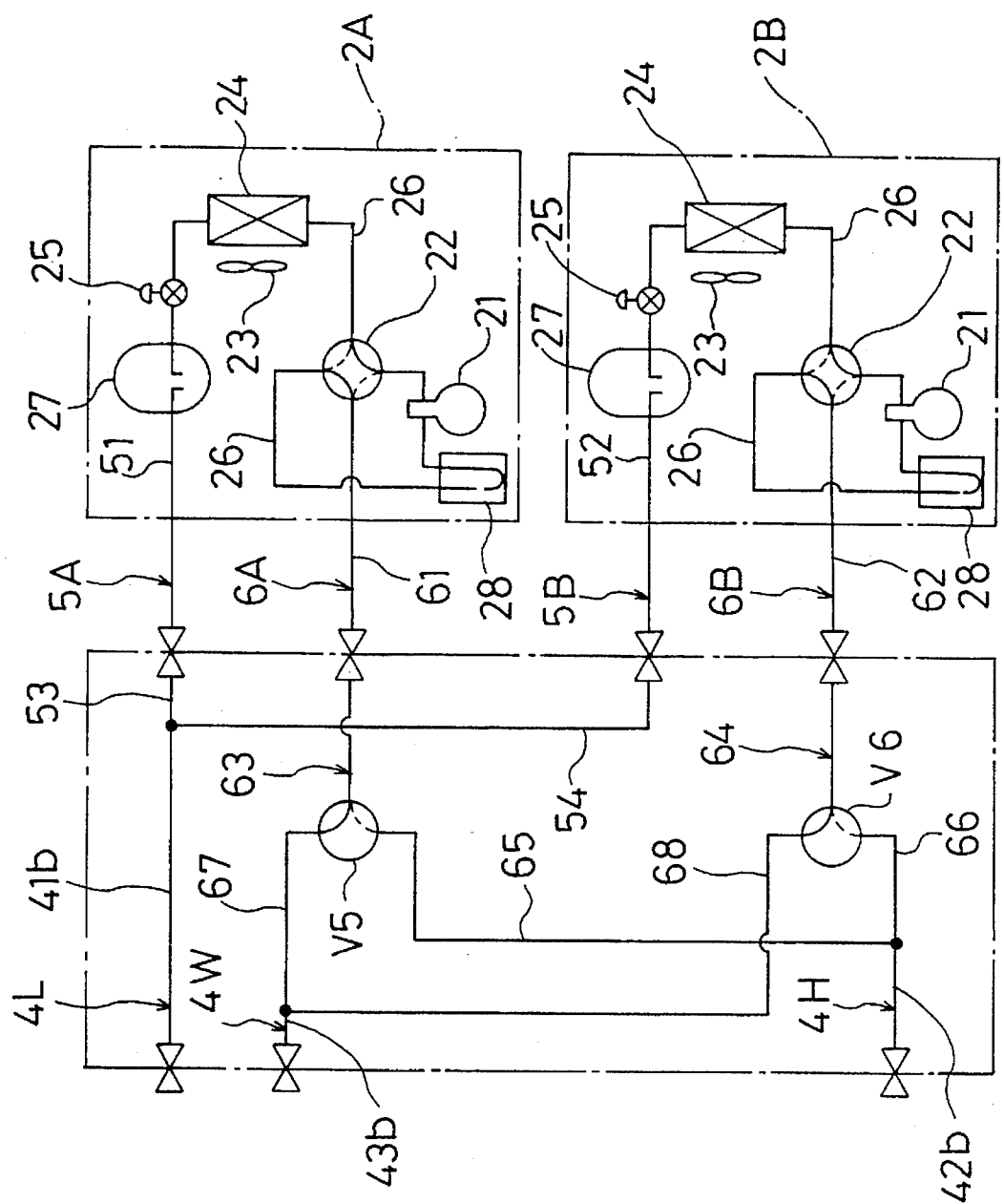
FIG. 3 is a refrigerant circuit diagram of a main part of an air conditioner showing Example 2 of the present invention.

FIG. 3 shows an example of a refrigeration apparatus according to claim 3 of the present invention. In this example, three-way selector valves (V5, V6) as switching means are applied in stead of the non-return valves (V1, V2, V3, V4) shown in Example 1 of FIG. 1.

In detail, the switching is made between the high-pressure passage (65, 66) and the low-pressure passage (67, 68) of each of the gas lines (6A, 6B) extending to the outdoor units (2A, 2B) by the three-way selector valves (V5, V6), so that the high-pressure passage (65, 66) or the low-pressure passage (67, 68) is connected to the gas pipes (61, 62). When all the indoor units (3, 3, . . .) are under cooling operation, the three-way selector valve (V5, V6) are switched as shown in solid lines of FIG. 3 so that the main low-pressure gas line (4W) is communicated with the inlet sides of the compressors (21) through the low-pressure passages (67, 68). When all the indoor units (3, 3, . . .) are under heating operation, the three-way selector valve (VS, V6) are switched as shown in dash lines of FIG. 3 so that the main high-pressure gas line (4H) is communicated with the discharge sides of the compressors (21) through the high-pressure passages (65, 66).

At a simultaneous cooling and heating operation, the four-way selector valve (22) and the three-way selector valve (V5) of the first outdoor unit (2A) are switched as shown in solid lines of FIG. 3, so that the first outdoor units (2A) turns a cooling cycle and the main low-pressure gas line (4W) is communicated with the inlet side of the compressor (21) through the low-pressure passage (67). Further, the four-way selector valve (22) and the three-way selector valve (V6) of the second outdoor unit (2B) are switched as shown in dash lines of FIG. 3, so that the second outdoor units (2A) turns a heating cycle and the main high-pressure gas line (4H) is communicated with the discharge side of the compressor (21) through the high-pressure passage (66). Then, as in the example of FIG. 1, a gas refrigerant is condensed in the first outdoor unit (2A) to turn a liquid refrigerant, a part or all of the liquid refrigerant is evaporated in the second outdoor unit (2B) and the high-pressure gas refrigerant is supplied from the second outdoor unit (2B) to the indoor units (3, 3, . . .).

Other constructions, operations and effects are the same as Example 1 shown in FIG. 1.

MODIFICATION OF EXAMPLE 2

Figure 4:
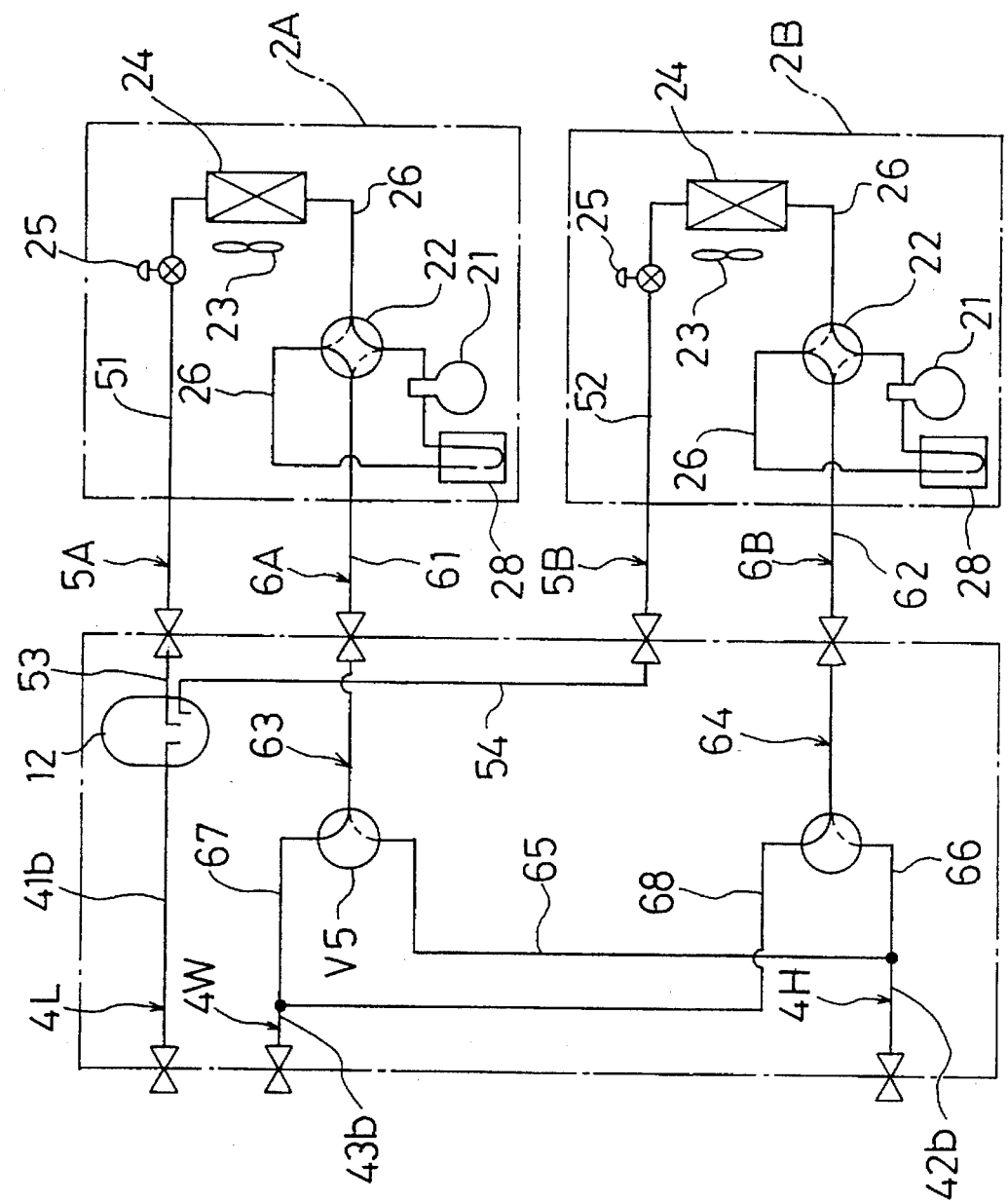
FIG. 4 is a refrigerant circuit diagram showing a main part of a modification of Example 2.

FIG. 4 shows a modification of the above Example 2 shown in FIG. 3 and an example of a refrigeration apparatus according to claim 12 of the present invention. A single receiver (12) is provided in the piping unit (11). The receiver (12) is disposed at a connecting part between the main liquid passage (41b) and the liquid passages (53, 54) running to the outdoor units (2A, 2B). The receiver (12) stores liquid refrigerants, collects liquid refrigerants from the outdoor units (2A, 2B) to the main liquid line (4L) at a cooling operation, distributes a liquid refrigerant from the main liquid line (4L) to the outdoor units (2A, 2B) at a heating operation, and sends a liquid refrigerant from the first outdoor unit (2A) to the second outdoor unit (2B) at a simultaneous cooling and heating operation. In this case, the receivers (27) of the outdoor units (2A, 2B) as shown in FIG. 3 are dispensed with.

Other constructions, operations and effects are the same as in Example 2 shown in FIG. 3.

EXAMPLE 3

Figure 5:
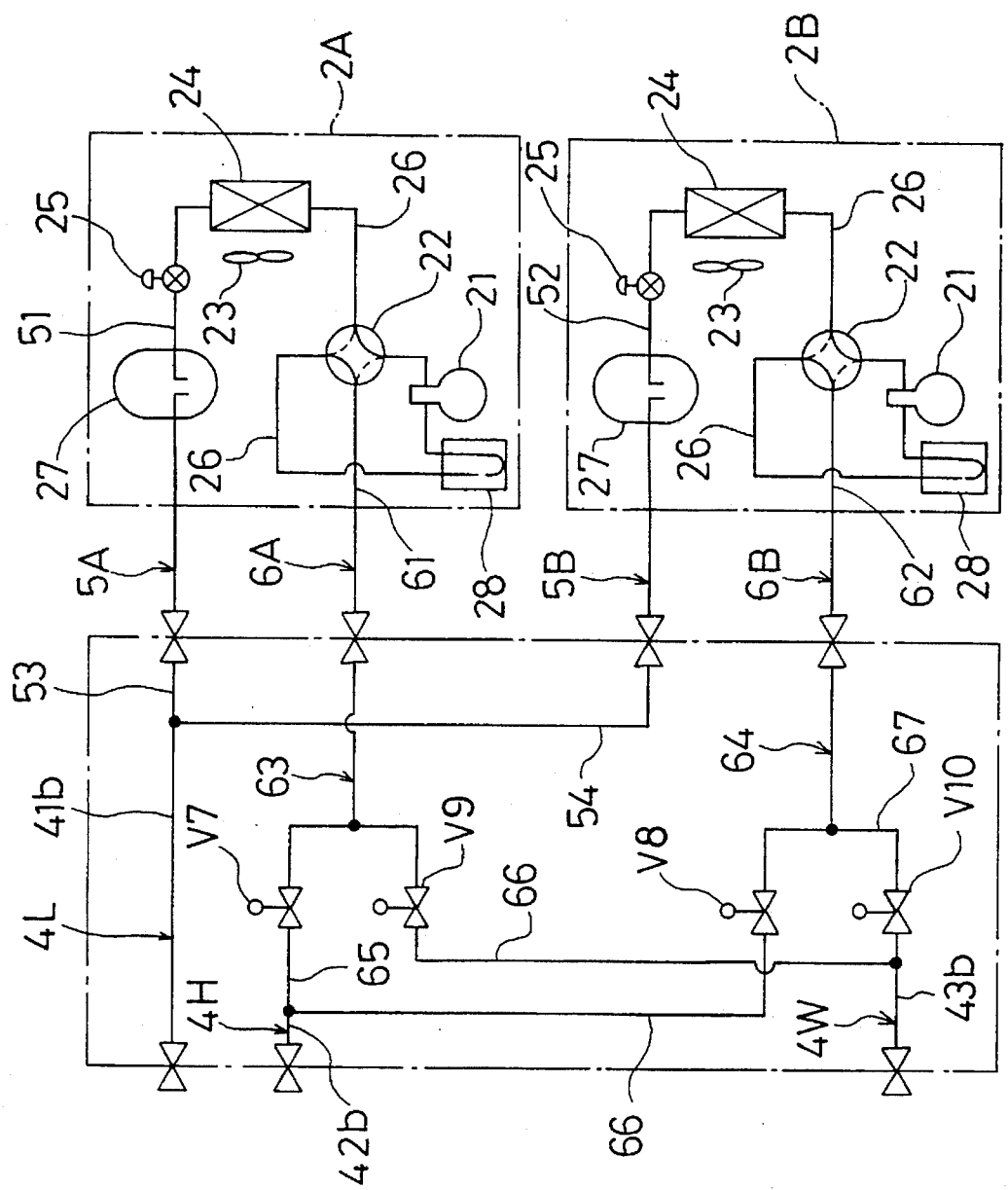
FIG. 5 is a refrigerant circuit diagram of a main part of an air conditioner showing Example 3 of the present invention.

FIG. 5 shows another example of a refrigeration apparatus according to claim 3 of the present invention. In this example, stop valves (V7, V8, V9, V10) as switching means are applied in stead of the non-return valves (V1, V2, V3, V4) shown in Example 1 of FIG. 1.

In detail, the high-pressure passages (65, 66) and the low-pressure passages (67, 68) of the gas lines (6A, 6B) extending to the outdoor units (2A, 2B) are provided with the stop valves (V7, V8, V9, V10). When all the indoor units (3, 3, . . .) are under cooling operation, the stop valves (V7, V8) of the high-pressure passages (65, 66) are closed and the stop valves (V9, V10) of the low-pressure passages (67, 68) are opened, so that the main low-pressure gas line (4W) is communicated with the inlet sides of the compressors (21) through the low-pressure passages (67, 68). When all the indoor units (3, 3, . . .) are under heating operation, the stop valves (V7, V8) of the high-pressure passages (65, 66) are opened and the stop valves (V9, V10) of the low-pressure passages (67, 68) are closed, so that the main high-pressure gas line (4H) is communicated with the discharge sides of the compressors (21) through the high-pressure passages (65, 66).

At a simultaneous cooling and heating operation, the four-way selector valve (22) of the first outdoor unit (2A) is switched as shown in solid lines of FIG. 4, the stop valve (V7) of the high-pressure passage (65) is closed and the stop valve (V9) of the low-pressure passage (68) is opened, so that the first outdoor unit (2A) turns a cooling cycle and the main low-pressure gas line (4W) is communicated with the inlet side of the compressor (21) through the low-pressure passage (68). The four-way selector valve (22) of the second outdoor unit (2B) is switched as shown in dash lines of FIG. 4, the stop valve (V8) of the high-pressure passage (66) is opened and the stop valve (V10) of the low-pressure passage (67) is closed, so that the second outdoor unit (2B) turns a heating cycle and the main high-pressure gas line (4H) is communicated with the discharge side of the compressor (21) through the high-pressure passage (66). Then, as in the example of FIG. 1, a gas refrigerant is condensed in the first outdoor unit (2A) to turn a liquid refrigerant, a part or all of the liquid refrigerant is evaporated in the second outdoor unit (2B) and a high-pressure gas refrigerant is supplied from the second outdoor unit (2B) to the indoor units (3, 3, . . .).

Other constructions, operations and effects are the same as Example 1 shown in FIG. 1.

Also in Example 3 of FIG. 5, as shown in FIG. 2, a single receiver (12) may be disposed in the piping unit (11), in stead of the receivers (27).

EXAMPLE 4

Figure 6:
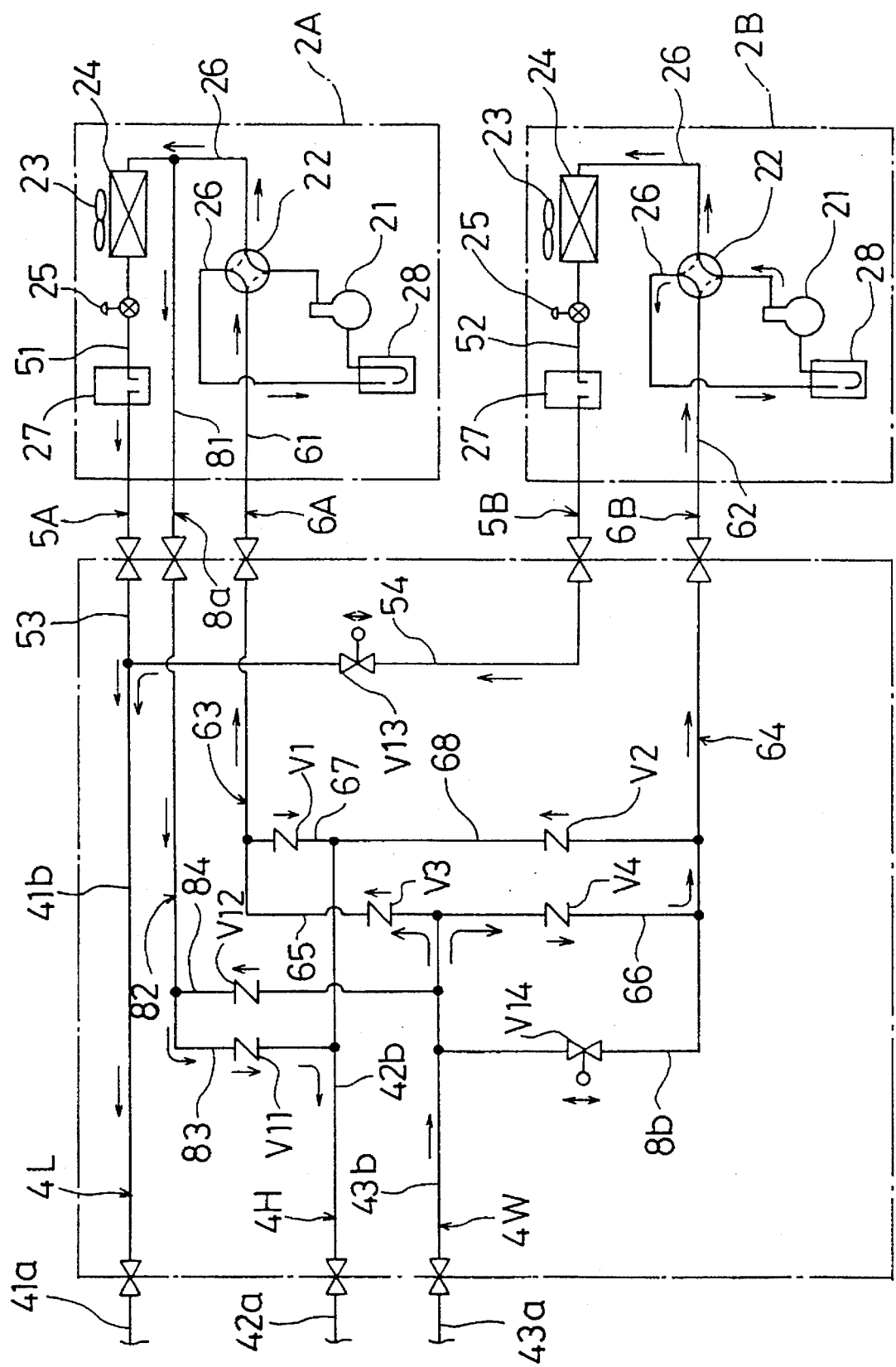
FIG. 6 is a refrigerant circuit diagram of a main part of an air conditioner showing Example 4 of the present invention.

FIG. 6 shows an example of a refrigeration apparatus according to claims 5, 6, 16 and 17 of the present invention. In this example, an auxiliary gas line (8a) is provided in the air conditioner (1) of Example 1 shown in FIG. 1 so that the operation performance of the air conditioner (1) can be regulated.

The auxiliary gas line (8*a*) is composed of an auxiliary gas pipe (81) extending outward from the first outdoor unit (2A), and an auxiliary gas passage (82) connected to an outer end of the auxiliary gas pipe (81). An inner end of the auxiliary gas pipe (81) is connected to a portion of the gas-refrigerant pipe (28) which is located between the outdoor heat exchanger (24) and the four-way selector valve (22) of the first outdoor unit (2A). The auxiliary gas passage (82) is branched to a high-pressure auxiliary passage (83) and a low-pressure auxiliary passage (84). The high-pressure auxiliary passage (83) is connected to the main high-pressure gas passage (42*b*) and provided with a non-return valve (V11) for allowing a refrigerant to flow from the first outdoor unit (2A) to the main high-pressure gas line (4H). The low-pressure auxiliary passage (84) is connected to the main low-pressure gas passage (43*b*) and provided with a non-return valve (V12) for allowing a refrigerant to flow from the main low-pressure gas line (4W) to the first outdoor unit (2A). The auxiliary gas line (8*a*) regulates cooling performances and heating performances of both the outdoor units (2A, 2B).

Further, as a feature of the present invention, a liquid stop valve (V13) is disposed in the liquid passage (54) extending from the second outdoor unit (2B). The liquid stop valve (V13) is disposed in the proximity of a connecting part between the liquid passage (54) and the main liquid passage (41*b*) of the main liquid line (4L), and serves as a liquid-line closing mechanism which is fully closed based on a control signal of a controller when the second outdoor unit (2B) is deactivated during cooling operation and heating operation.

Furthermore, as a feature of the present invention, a refrigerant recovering passage (8*b*) is connected between the main low-pressure gas passage (43*b*) of the main low-pressure gas line (4W) and a portion of the gas passage (64) which is located on the second outdoor unit's (2B) side of the high-pressure passage (66) and the low-pressure passage (68). A recovering stop valve (V14) is provided in the refrigerant recovering passage (8*b*). The recovering stop valve (V14) serves as a recovery closing mechanism which is opened based on a control signal of a controller when the second outdoor unit (2B) is deactivated during cooling operation and heating operation so as to prevent a liquid refrigerant from being stored in the second outdoor unit (2B).

The piping unit (11) is so composed that the liquid passages (53, 54) of the liquid lines (5A, 5B), the gas passages (63, 64) of the gas lines (6A, 6B), the main liquid passage (41*b*) of the main liquid line (4L), the main high-pressure gas passage (42*b*) of the main high-pressure gas line (4H), the main low-pressure gas passage (43*b*) of the main low-pressure gas line (4W), the auxiliary gas passage (82) of the auxiliary gas line (8*a*), and the refrigerant recovering passage (8*b*) are integrally formed and unitized with the non-return valves (V1–V4, V11, V12), the liquid stop valve (V13) and the recovering stop valve (V14).

OPERATION OF EXAMPLE 4

Next, description is made about the operation of the air conditioner (1) shown in FIG. 6, with reference to FIG. 6 to FIG. 9.

In the case that all the indoor units (3, 3, . . .) are under cooling operation or heating operation, the air conditioner (1) operates in the same manner as in the example shown in FIG. 1 and the auxiliary gas line (8*a*) is not involved in the operation.

A case that cooling performance is required high at a simultaneous cooling and heating operation is shown in FIG. 6. For example, such a case corresponds to the case that one indoor unit (3) is under heating operation and all other indoor units (3, 3, . . .) are under cooling operation. In this case, both the four-way selector valves (22) of the first and second outdoor units (2A, 2B) are switched as shown in solid lines of FIG. 6, so that the first and second outdoor units (2A, 2B) turn cooling cycles, respectively. Accordingly, high-pressure gas refrigerants discharged from the compressors (21) of the first and second outdoor units (2A, 2B) are condensed at the outdoor heat exchangers (24) to turn liquid refrigerants, respectively. Then, most of the liquid refrigerants are collected to the main liquid line (4L) and flow therethrough.

A part of the high-pressure gas refrigerant discharged from the compressor (21) of the first outdoor unit (2A) flows through the auxiliary gas line (8*a*), the high-pressure auxiliary passage (83) and the main high-pressure gas line (4H) in order, and flows into the indoor unit (3) in heating operation. In the indoor unit (3) in heating operation, the high-pressure gas refrigerant is condensed to turn a liquid refrigerant. The liquid refrigerant is collected at the flow divider (44) of the main liquid line (4L) with the liquid refrigerants flowing from the first and second outdoor units (2A, 2B), and then flows into the indoor units (3, 3, . . .) in cooling operation. In each of the indoor units (3, 3, . . .) in cooling operation, the liquid refrigerant is evaporated to turn a low-pressure gas refrigerant. The low-pressure gas refrigerant flows through the main low-pressure gas line (4W) and returns to the compressors (21) of the first and second outdoor units (2A, 2B). The above circulating process is repeated.

Figure 7:
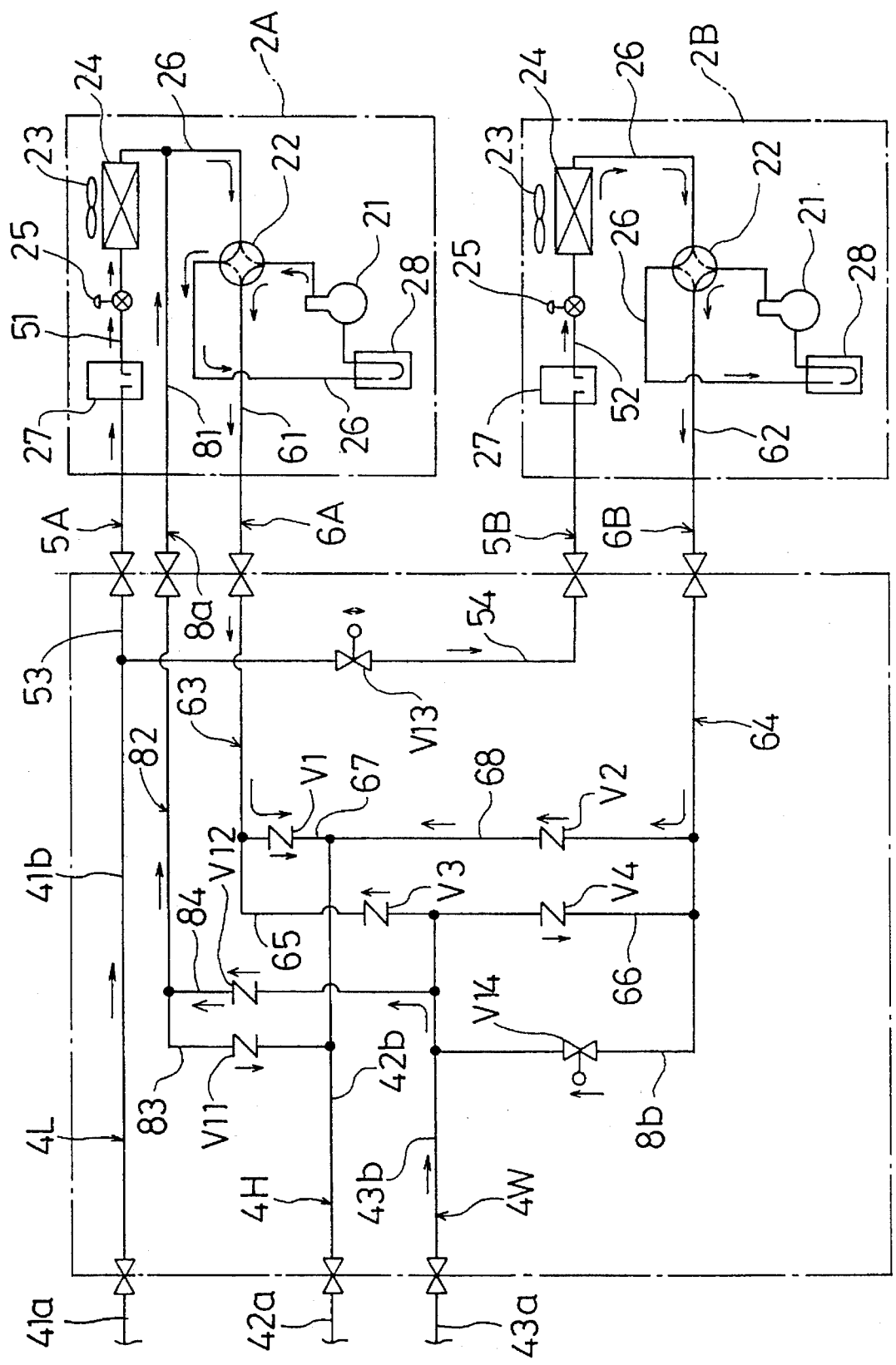
FIG. 7 is a refrigerant circuit diagram of the main part of the air conditioner showing another operation state of Example 4.

A case that heating performance is required high at a simultaneous cooling and heating operation is shown in FIG. 7. For example, such a case corresponds to the case that one indoor unit (3) is under cooling operation and all other indoor units (3, 3, . . .) are under heating operation. In this case, both the four-way selector valves (22) of the first and second outdoor units (2A, 2B) are switched as shown in solid lines of FIG. 7, so that the first and second outdoor units (2A, 2B) turns heating cycles, respectively. Accordingly, high-pressure gas refrigerants discharged from both the compressors (21) of the first and second outdoor units (2A, 2B) flow through the high-pressure passages (65, 66) of the gas lines (6A, 6B) respectively, and meet each other at the main high-pressure gas line (4H). Then, the collected gas refrigerant is distributed to the indoor units (3, 3, . . .) in heating operation. In the indoor units (3, 3, . . .) in heating operation, the respective gas refrigerant are condensed to turn respective liquid refrigerants. Then, the liquid refrigerants are collected at the flow divider (44) of the main liquid line (4L). Most of the collected liquid refrigerant flows through the main liquid line (4L), and flows into the first and second outdoor units (2A, 2B). In each of the outdoor units (2A, 2B), the liquid refrigerant is evaporated at the outdoor heat exchanger (24) to turn a low-pressure gas refrigerant.

A part of the liquid refrigerant is divided at the flow divider (44) of the main liquid line (4L) to flow into the indoor unit (3) in cooling operation via the branch liquid pipe (41*c*). The liquid refrigerant is evaporated in the indoor unit (3) to turn a low-pressure gas refrigerant. The low-pressure gas refrigerant flows through the main low-pressure gas line (4W), the low-pressure auxiliary passage (84) and the auxiliary gas line (8*a*) in order, and flows into the first outdoor unit (2A). The low-pressure gas refrigerant is collected with the low-pressure gas refrigerant of the first outdoor unit (2A).

Then, the respective low-pressure gas refrigerants are returned to the compressors (21) of the first and second outdoor units (2A, 2B). The above circulating process is repeated.

Figure 8:
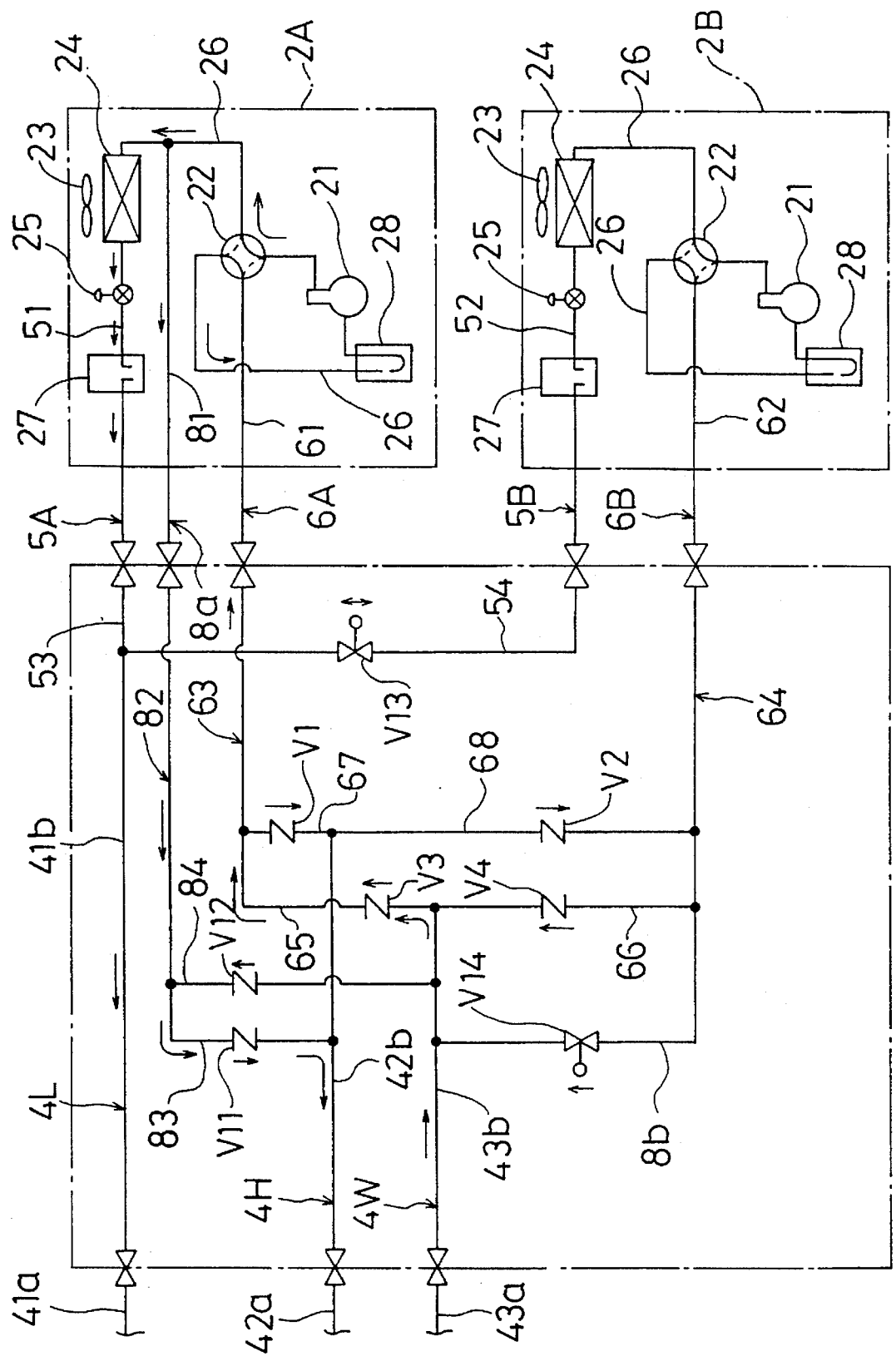
FIG. 8 is a refrigerant circuit diagram of a main part of an air conditioner showing still another operation state of Example 4.

A case that cooling performance and heating performance are required low and cooling performance is required higher than heating performance at a simultaneous cooling and heating operation is shown in FIG. 8. In this case, the second outdoor unit (2B) is deactivated.

In the first outdoor unit (2A), the four-way selector valve (22) is switched as shown in solid lines of FIG. 8 so that the first outdoor unit (2A) turns a cooling cycle. A high-pressure gas refrigerant discharged from the compressor (21) of the first outdoor unit (2A) is condensed at the outdoor heat exchanger (24) to turn a liquid refrigerant. The liquid refrigerant flows into the main liquid line (4L).

A part of the high-pressure gas refrigerant discharged from the compressor (21) of the first outdoor unit (2A) flows through the auxiliary gas line (8a), the high-pressure auxiliary passage (83) and the main high-pressure gas line (4H) in order, and flows into the indoor unit (3) in heating operation. In the indoor unit (3) in heating operation, the high-pressure gas refrigerant is condensed to turn a liquid refrigerant. The liquid refrigerant is collected at the flow divider (44) of the main liquid line (4L) with the liquid refrigerant flowing from the first outdoor unit (2A), and then flows into the indoor units (3, 3, . . .) in cooling operation. In each of the indoor units (3, 3, . . .) in cooling operation, the liquid refrigerant is evaporated to turn a low-pressure gas refrigerant. The low-pressure gas refrigerant flows through the main low-pressure gas line (4W) and returns to the compressor (21) of the first outdoor unit (2A). The above circulating process is repeated.

Figure 9:
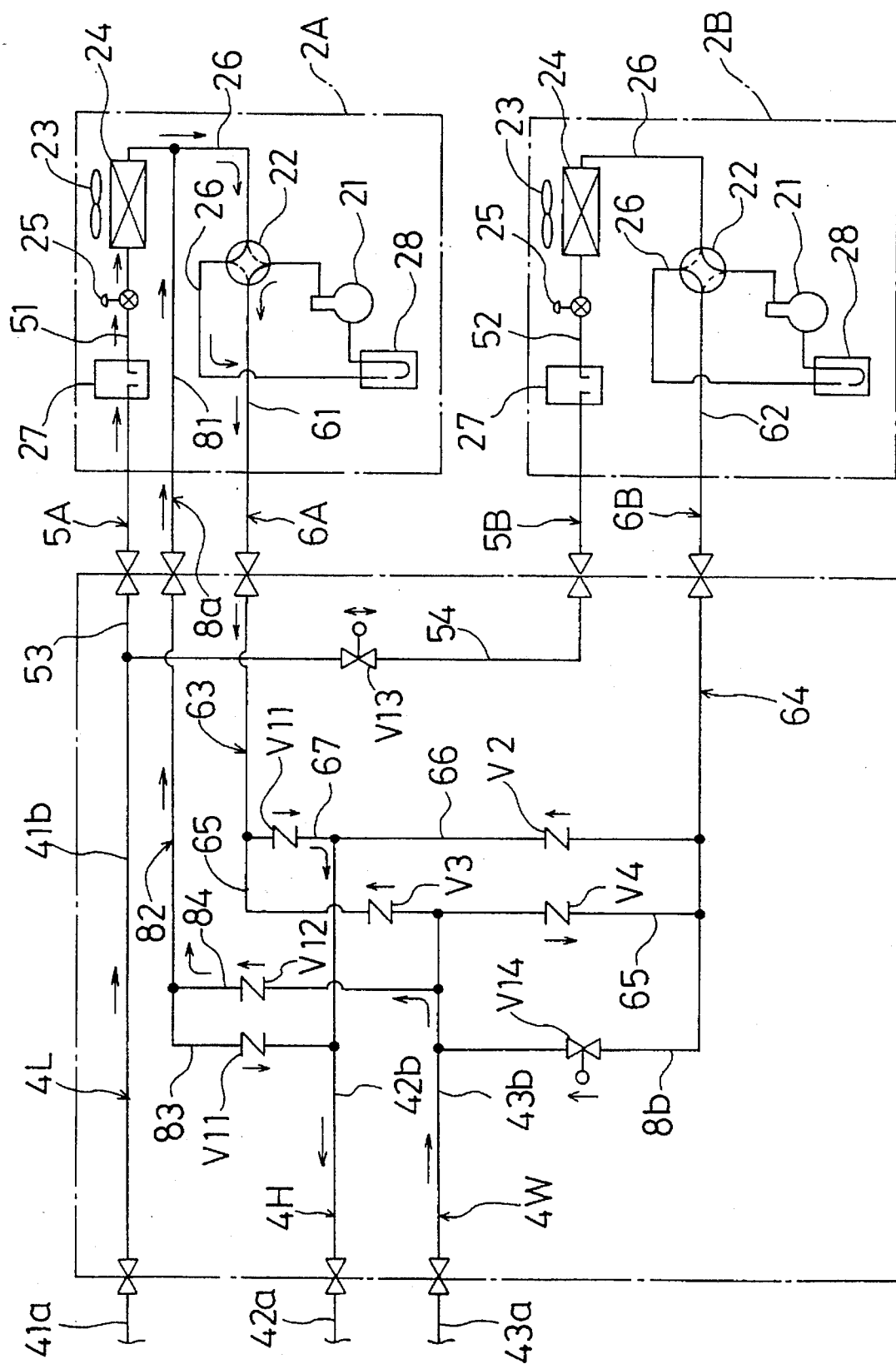
FIG. 9 is a refrigerant circuit diagram of a main part of an air conditioner showing still another operation state of Example 4.

A case that cooling performance and heating performance are required low and heating performance is required higher than cooling performance at a simultaneous cooling and heating operation is shown in FIG. 9. In this case, the second outdoor unit (2B) is deactivated, as in the case shown in FIG. 8.

In the first outdoor unit (2A), the four-way selector valve (22) is switched as shown in solid lines of FIG. 8 so that the first outdoor unit (2A) turns a heating cycle. A high-pressure gas refrigerant discharged from the compressor (21) of the first outdoor unit (2A) flows through the gas line (6A) and the main high-pressure gas line (4H). Then, the gas refrigerant is distributed to the indoor units (3, 3, . . .) in heating operation. In the indoor units (3, 3, . . .) in heating operation, the respective gas refrigerants are condensed to turn respective liquid refrigerants. Then, the liquid refrigerants are collected at the flow divider (44) of the main liquid line (4L). Most of the collected liquid refrigerant flows through the main liquid line (4L), and flows into the first outdoor unit (2A). In the first outdoor unit (2A), the liquid refrigerant is evaporated at the outdoor heat exchanger (24) to turn a low-pressure gas refrigerant.

A part of the liquid refrigerant is divided at the flow divider (44) of the main liquid line (4L) to flow into the indoor unit (3) in cooling operation via the branch liquid pipe (41c). The liquid refrigerant is evaporated in the indoor unit (3) to turn a low-pressure gas refrigerant. The low-pressure gas refrigerant flows through the main low-pressure gas line (4W), the low-pressure auxiliary passage (84) and the auxiliary gas line (8a) in order, and flows into the first outdoor unit (2A). The low-pressure gas refrigerant is collected with the low-pressure gas refrigerant of the first outdoor unit (2A).

Then, the respective low-pressure gas refrigerants are returned to the compressor (21) of the first outdoor unit (2A). The above circulating process is repeated.

Also in this example, when cooling performance and heating performance are required at the same level as in the example of FIG. 1, the simultaneous cooling and heating operation is performed in such a manner that the first outdoor unit (2A) turns a cooling cycle and the second outdoor unit (2B) turns a heating cycle or in the opposite manner.

Further, when the second outdoor unit (2B) is deactivated during operation, the liquid stop valve (V13) is closed thereby preventing the liquid refrigerant from being stored in the receiver (27) and the like. In detail, since the pressure of the liquid refrigerant during operation is higher than a saturation pressure according to an open-air temperature, the liquid refrigerant may be stored in the receiver (27). However, in this example, the storage of the liquid refrigerant is prevented.

Furthermore, when the second outdoor unit (2B) is deactivated during operation, the gas passage (64) of the second outdoor unit (2B) is communicated with the main low-pressure gas line (4W) through the refrigerant recovering passage (8b), so that the refrigerant in the second outdoor unit (2B) is returned to the main low-pressure gas line (4W). This prevents the storage of the liquid refrigerant into the second outdoor unit (2B).

EFFECTS OF EXAMPLE 4

According to this example, since there is provided the auxiliary gas line (8a), a simultaneous cooling and heating operation can be performed, in addition to the case that cooling performance and heating performance are required at the same level, in the case that cooling performance is required high, in the case that heating performance is required high, and in the case that cooling performance and heating performance are required low. This results in increasing the extent of operation of the air conditioner (1), so that the air conditioner (1) can correspond to various kinds of states of use.

Further, since there is provided the auxiliary gas line (8a), this allows only the compressor (21) of the first outdoor unit (2A) to be controlled in capacity so as to be changed approximately in a linear proportion to an indoor load by an inverter circuit and allows the compressor (21) of the second outdoor unit (2B) to be controlled in capacity so as to be switched among three steps by unloading control, thereby increasing the extent of operation of the air conditioner (1) as mentioned above. Thus, the air conditioner (1) can cope with various kinds of states of use by a simple control mechanism.

Further, the liquid stop valve (V13) is provided on the liquid line (5B) extending from the second outdoor unit (2B). Accordingly, when the second outdoor unit (2B) is deactivated during cooling operation and heating operation, the liquid stop valve (V13) is closed thereby preventing the liquid refrigerant from being stored in the receiver (27) and the like.

Furthermore, since there is provided the refrigerant recovering passage (8b), the gas passage (64) of the second outdoor unit (2B) is communicated with the main low-pressure gas line (4W) through the refrigerant recovering passage (8b) when the second outdoor unit (2B) is deactivated during operation. This prevents the storage of the liquid refrigerant into the second outdoor unit (2B).

Other constructions, operations and effects are the same as in Example 1 shown in FIG. 1.

EXAMPLE 5

Figure 10:
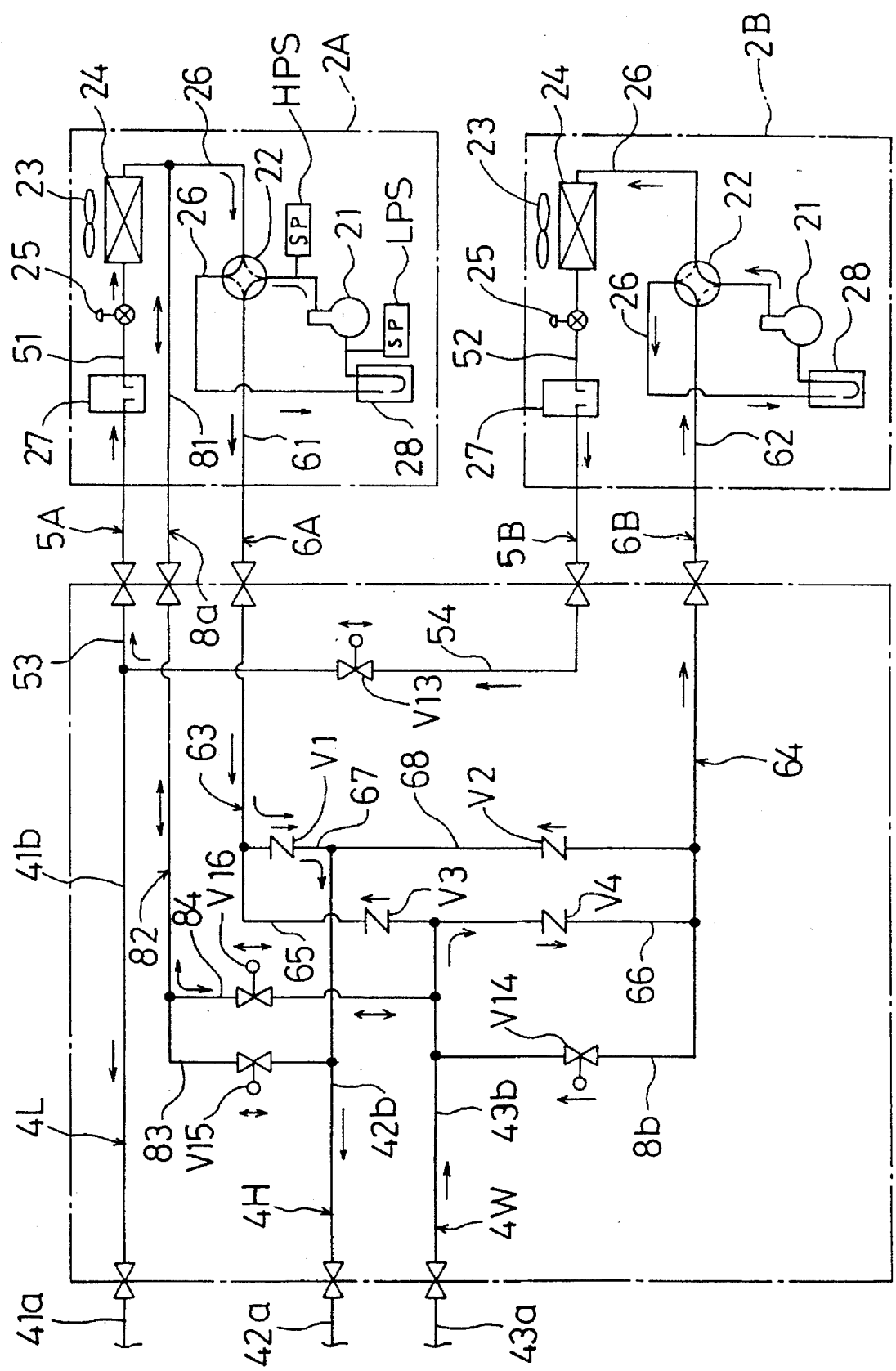
FIG. 10 is a refrigerant circuit diagram of a main part of an air conditioner showing Example 5 of the present invention.
Figure 11:
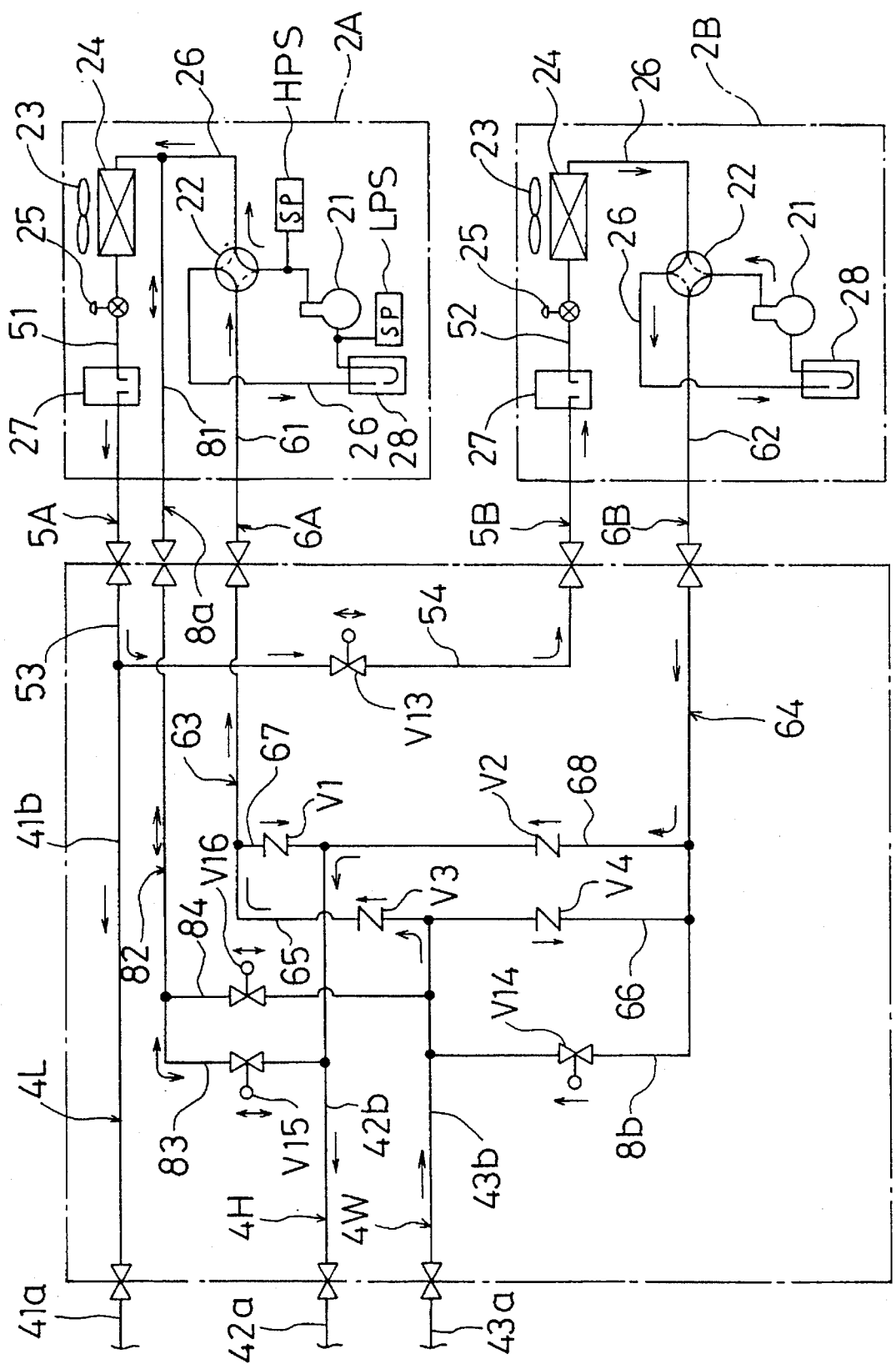
FIG. 11 is a refrigerant circuit diagram of a main part of an air conditioner showing another operation state of Example 5.

FIG. 10 and FIG. 11 show an example of a refrigeration apparatus according to claims 7, 8, 16 and 17. In the air conditioner (1) of Example 4 shown in FIG. 6 to FIG. 9, reversible valves (V15, V16) are provided in the auxiliary gas line (8a), in stead of the non-return valves (V11, V12), in order that sensors can be shared between the first and second outdoor units (2A, 2B).

In detail, in the high-pressure auxiliary passage (83) of the auxiliary gas line (8a), there is provided a high-pressure reversible valve (V15) for allowing a refrigerant to flow bidirectionally between the first outdoor unit (2A) and the main high-pressure gas line (4H). In the low-pressure auxiliary passage (84), there is provided a low-pressure reversible valve (V16) for allowing a refrigerant to flow bidirectionally between the first outdoor unit (2A) and the main low-pressure gas line (4W). In the piping unit (11), the high-pressure reversible valve (V15) and the low-pressure reversible valve (V16) are integrally formed.

Further, in the first outdoor unit (2A), a high-pressure sensor (HPS) for detecting a pressure of a discharged refrigerant is disposed in the gas-refrigerant pipe (26) on the discharge side of the compressor (21), and a low-pressure sensor (LPS) for detecting a pressure of a refrigerant to be sucked into the compressor (21) is disposed in the gas-refrigerant pipe (26) on the inlet side of the compressor (21). In the second outdoor unit (2B), both the pressure sensors (HPS, LPS) are dispensed with.

Other constructions are the same as in Example 4 shown in FIG. 6 to FIG. 9.

OPERATION OF EXAMPLE 5

Next, description is made about the example shown in FIG. 10 and FIG. 11.

In the case that all the indoor units (3, 3, . . .) are under cooling operation and both the first and second outdoor units (2A, 2B) are in cooling cycles, both the reversible valves (V15, V16) are closed. Further, as shown in FIG. 10, in the case that: a simultaneous cooling and heating operation is performed to the indoor units (3, 3, . . .); the four-way selector valve (22) of the first outdoor unit (2A) is switched as shown in solid lines of FIG. 10 so that the first outdoor unit (2A) turns a heating cycle; and that the four-way selector valve (22) of the second outdoor unit (2B) is switched as shown in solid lines of FIG. 10 so that the second outdoor unit (2B) turns a cooling cycle, the high-pressure reversible valve (V15) is closed and the low-pressure reversible valve (V16) is opened. As a result, in either of the above cases, a pressure of a low-pressure refrigerant of the second outdoor unit (2B) is equal to a pressure of a low-pressure refrigerant of the first outdoor unit (2A), and the pressure of the low-pressure refrigerant of the second outdoor unit (2B) which is important in a cooling cycle is detected by the low-pressure sensor (LPS) of the first outdoor unit (2A).

Accordingly, since the pressures of the low-pressure refrigerants of the first and second outdoor units (2A, 2B) are equal to each other, excess and lack of cooling performance are controlled by a combination of the capacity of the compressor (21) of the first outdoor unit (2A) with the capacity of the compressor (21) of the second outdoor unit (2B), and the capacity of the compressor (21) and the opening of the outdoor motor-operated expansion valve (25) are regulated so as to prevent that the pressure of the low-pressure refrigerant becomes excessively low because of an unbalanced flow of the liquid refrigerant and the like.

In the case that all the indoor units (3, 3, . . .) are under heating operation and both the first and second outdoor units (2A, 2B) are in heating cycles, both the reversible valves (V15, V16) are closed. Further, as shown in FIG. 11, in the case that a simultaneous cooling and heating operation is performed to the indoor units (3, 3, . . .), the four-way selector valve (22) of the first outdoor unit (2A) is switched as shown in solid lines of FIG. 11 so that the first outdoor unit (2A) turns a cooling cycle, and that the four-way selector valve (22) of the second outdoor unit (2B) is switched as shown in solid lines of FIG. 11 so that the second outdoor unit (2B) turns a heating cycle, the high-pressure reversible valve (V15) is opened and the low-pressure reversible valve (V16) is closed. As a result, in either of the above cases, a pressure of a high-pressure refrigerant of the second outdoor unit (2B) is equal to a pressure of a high-pressure refrigerant of the first outdoor unit (2A), and the pressure of the high-pressure refrigerant of the second outdoor unit (2B) which is important in a heating cycle is detected by the high-pressure sensor (HPS) of the first outdoor unit (2A).

Accordingly, since the pressures of the high-pressure refrigerants of the first and second outdoor units (2A, 2B) are equal to each other, excess and lack of heating performance are controlled by a combination of the capacity of the compressor (21) of the first outdoor unit (2A) with the capacity of the compressor (21) of the second outdoor unit (2B), and the capacity of the compressor (21) and the opening of the outdoor motor-operated expansion valve (25) are regulated so as to prevent that the pressure of the high-pressure refrigerant becomes excessively high.

Other operations in this example are the same as in Example 4 shown in FIG. 6 to FIG. 9. In an operation state of FIG. 6 and FIG. 8, the low-pressure reversible valve (V16) is closed and the high-pressure reversible valve (V15) is opened. In an operation state of FIG. 7 and FIG. 9, the low-pressure reversible valve (V16) is opened and the high-pressure reversible valve (V15) is closed. It is a matter of course that the operations shown in FIG. 1 can be performed in this example.

EFFECTS OF EXAMPLE 5

According to this example, since the high-pressure sensor (HPS) and the low-pressure sensor (LPS) can be provided only in the first outdoor unit (2A), sensors of the second outdoor unit (2B) can be dispensed with. This reduces the number of elements without lowering accuracy of controlling the outdoor units (2A, 2B).

Further, operation performance can be regulated as in the example shown in FIG. 6 to FIG. 9 and sensors can be shared between the first and second outdoor units (2A, 2B) by simply substituting the reversible valves (V15, V16) for the non-return valves (V11, V12). This reduces the number of elements while increasing the extent of operation of the air conditioner (1).

EXAMPLE 6

Figure 12:
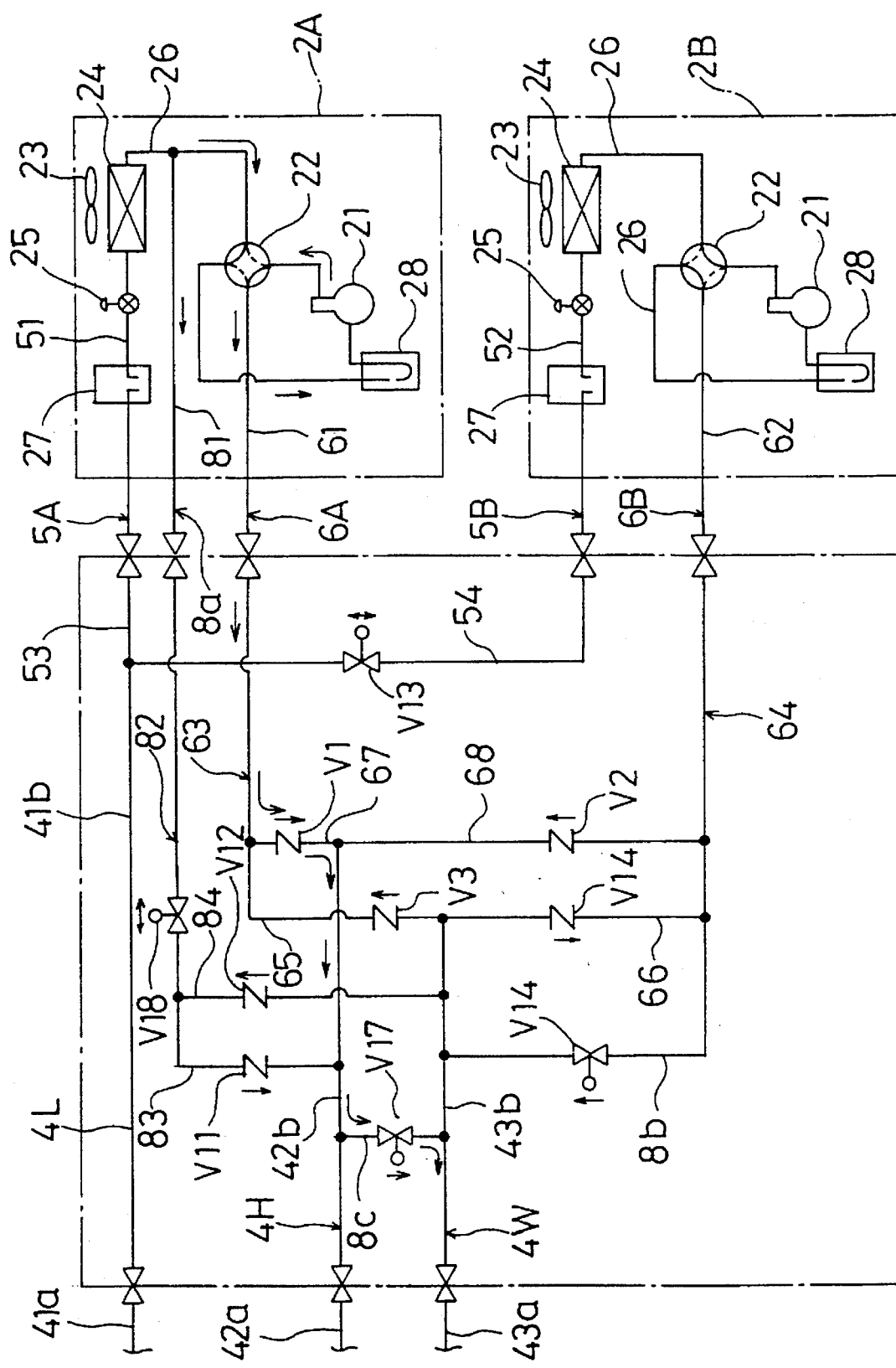
FIG. 12 is a refrigerant circuit diagram of a main part of an air conditioner showing Example 6 of the present invention.
Figure 13:
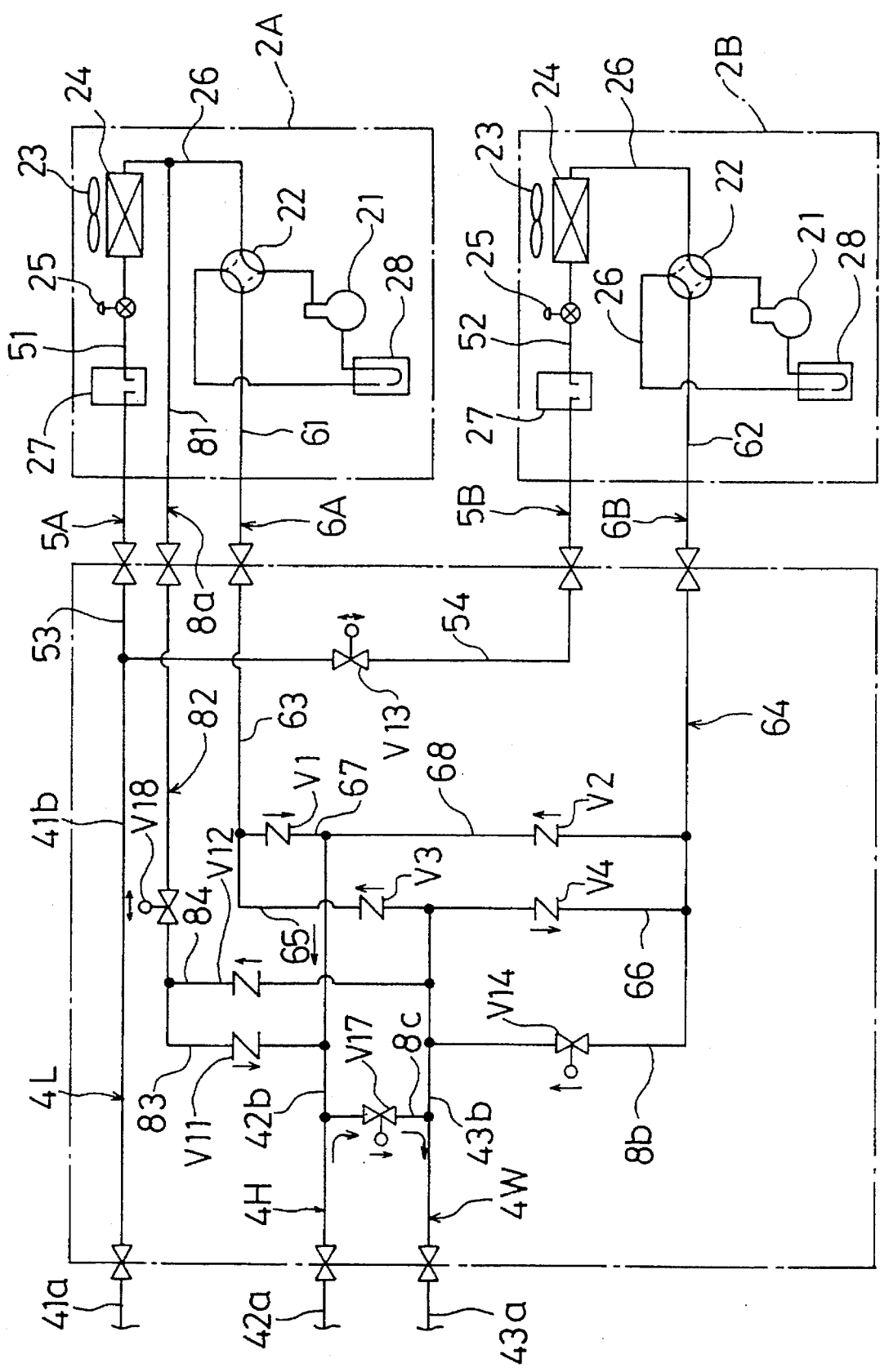
FIG. 13 is a refrigerant circuit diagram of a main part of an air conditioner showing another operation state of Example 6.

FIG. 12 and FIG. 13 show an example of a refrigeration apparatus according to claims 9, 10, 11, 16 and 17 of the present invention. In the air conditioner (1) shown in FIG. 6 to FIG. 9, there is provided an equalization passage (8c) for equalizing in pressure the main high-pressure gas line (4H) and the main low-pressure gas line (4W).

In detail, the equalization passage (8c) is connected between the main high-pressure gas passage (42b) of the main high-pressure gas line (4H) and the main low-pressure gas passage (43b) of the main low-pressure gas line (4W), and provided with an equalization valve (V17). The equalization valve (V17) serves as an equalizing and closing mechanism for allowing and preventing that a refrigerant flows from the main high-pressure gas passage (42b) to the main low-pressure gas passage (43b).

In the middle of the auxiliary gas passage (82) which runs from the high-pressure auxiliary passage (83) and the low-pressure auxiliary passage (84) toward the first outdoor unit (2A), there is provided an auxiliary reversible valve (V18). The auxiliary reversible valve (V18) serves as an auxiliary closing mechanism which is closed when the main low-pressure gas line (4W) is equalized in pressure with the main high-pressure gas line (4H).

In the piping unit (11), the equalization passage (8c), the equalization valve (V17) and the auxiliary reversible valve (V18) are integrally formed.

OPERATION AND EFFECTS OF EXAMPLE 6

Next, description is made about an equalizing operation of this example.

The equalizing operation is performed when the indoor units (3, 3, . . .) are switched in operation state. For example, when one indoor unit (3) is switched from a cooling operation to a heating operation, the low-pressure valve (72) is closed and the high-pressure valve (71) is opened.

When the main low-pressure gas line (4W) is equalized in pressure with the main high-pressure gas line (4H), as shown in FIG. 12, the four-way selector valve (22) of the first outdoor unit (2A) is switched as shown in solid lines of FIG. 12 so that the first outdoor unit (2A) is turned to a heating cycle. Further, the second outdoor unit (2B) is deactivated during operation, the auxiliary reversible valve (V18) is closed and the equalization valve (V17) is opened. Under this conditions, a high-pressure gas refrigerant discharged from the compressor (21) of the first outdoor unit (2A) flows through the gas line (6B), the main high-pressure gas line (4H) and the equalization passage (8c) in order, and flows into the main low-pressure gas line (4W). Thus, the main low-pressure gas line (4W) is equalized in a high-pressure state with the main high-pressure gas line (4H).

On the contrary, when the main high-pressure gas line (4H) is equalized in pressure with the main low-pressure gas line (4W), as shown in FIG. 13, both the first and second outdoor units (2A, 2B) are deactivated during operation and the equalization valve (V17) is opened. Under this conditions, the high-pressure gas refrigerant of the main high-pressure gas line (4H) flows into the main low-pressure gas line (4W), so that the main high-pressure gas line (4H) is equalized in a low-pressure state with the main low-pressure gas line (4W).

According to this example, since there is provided an equalization passage (8c), the main high-pressure gas line (4H) and the main low-pressure gas line (4W) are equalized in pressure when the indoor unit (3) is switched between a cooling operation and a heating operation. This securely prevents generation of vibrations and noises resulting from the switching of operation.

Other constructions, operations and effects are the same as in Example 4 shown in FIG. 6 to FIG. 9.

EXAMPLE 7

Figure 14:
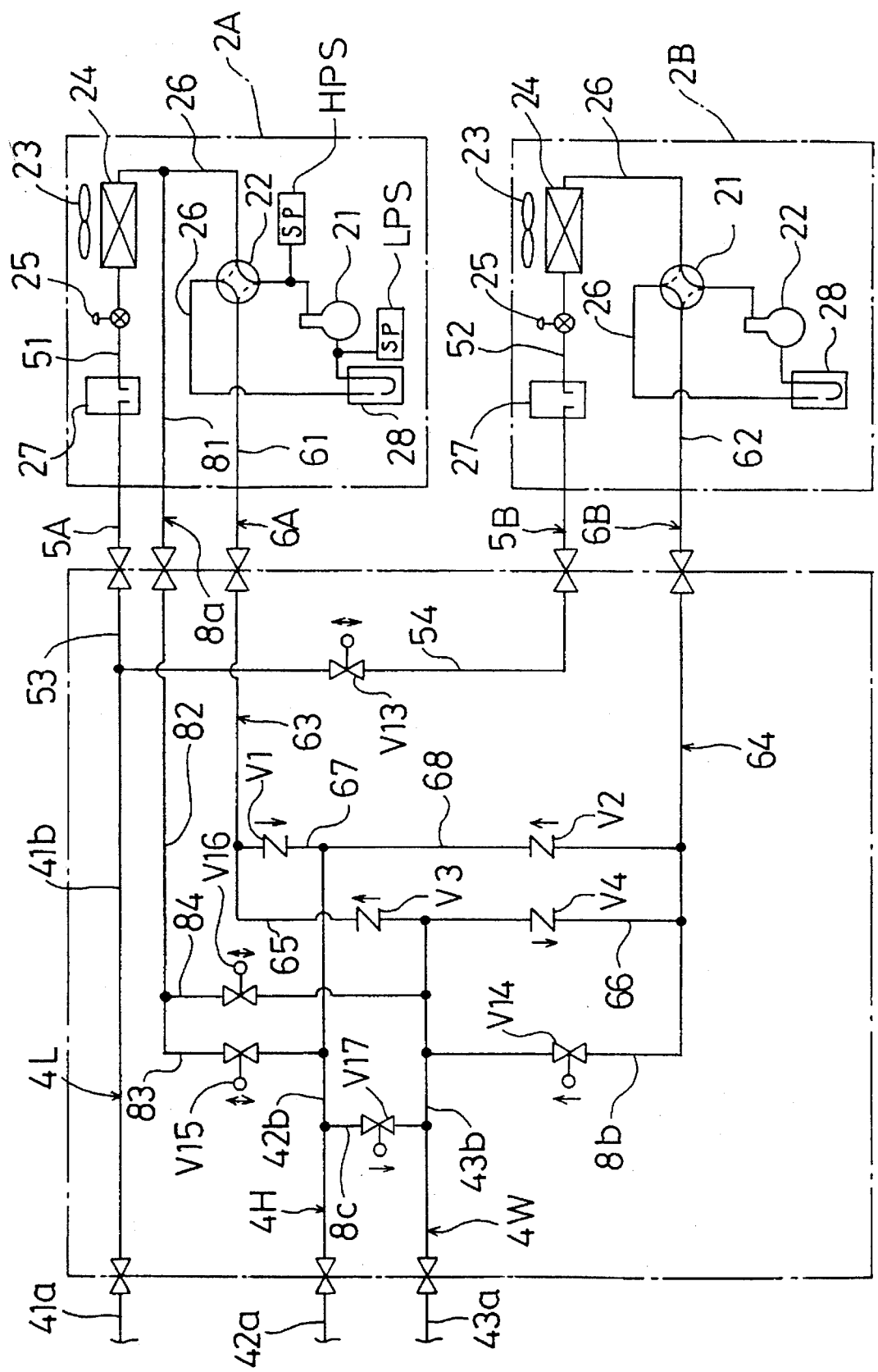
FIG. 14 is a refrigerant circuit diagram of a main part of an air conditioner showing Example 7 of the present invention.

FIG. 14 shows an example of a refrigeration apparatus according to claims 9, 10, 12, 16 and 17 of the present invention. In this example, an equalization passage (8c) is provided in the air conditioner (1) of Example 5 shown in FIG. 10 and FIG. 11 so that regulation of operation performance, sharing of sensors and an equalizing operation can be achieved. Other constructions, operations and effects are the same as in the equalization passage (8c) of the example shown in FIG. 10 and FIG. 11 and as in the equalization passage (8c) of the example shown in FIG. 12 and FIG. 13.

EXAMPLE 8

Figure 15:
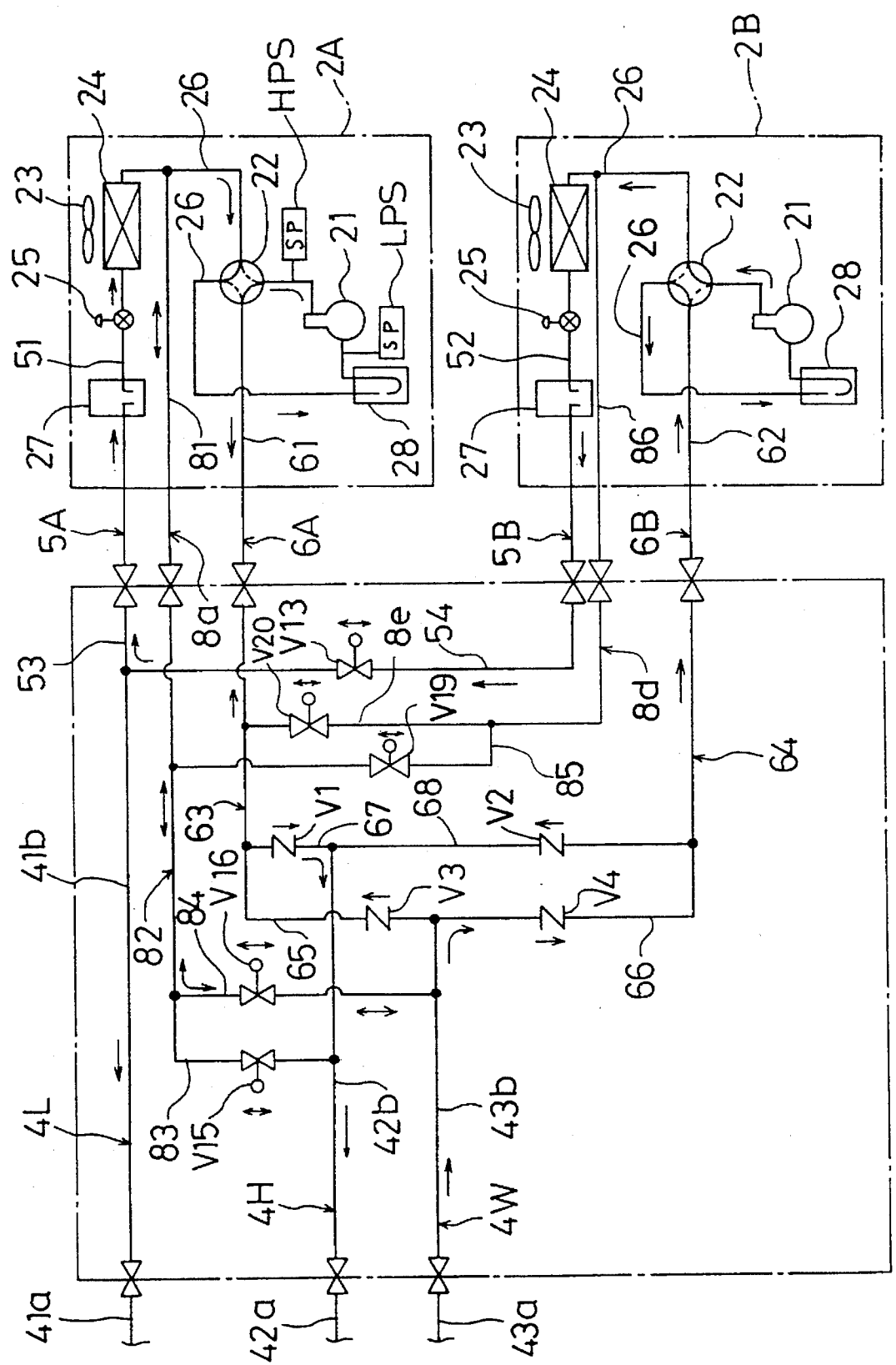
FIG. 15 is a refrigerant circuit diagram of a main part of an air conditioner showing Example 8 of the present invention.

FIG. 15 shows an example of a refrigeration apparatus according to claim 14 of the present invention. In the air conditioner (1) of Example 5 shown in FIG. 10 and FIG. 11, there is provided a gas common line (8d) having a first stop valve (V19) and a branch common passage (8e) having a second stop valve (V20) so that sensors can be shared between the first and second outdoor units (2A, 2B).

In detail, the gas common line (8d) is so composed that a gas common passage (85) and a gas common pipe (86) are connected. The gas common passage (85) is connected at an end thereof to the auxiliary gas passage (82) of the auxiliary gas line (8a). The gas common pipe (86) is connected at an end thereof to the gas-refrigerant pipe (26) extending from the outdoor heat exchanger (24) of the second outdoor unit (2B). The first stop valve (V19) is provided in the gas common passage (85) and serves as a first closing mechanism for allowing a refrigerant to flow bidirectionally.

An end of the branch common passage (8e) is connected to the gas passage (63) of the gas line (6A) extending from the first outdoor unit (2A). The other end of the branch common passage (8e) is connected to an end of the gas common passage (85) which is located on the second outdoor unit's (2B) side of the first stop valve (V19). The second stop valve (V20) serves as a second closing mechanism for allowing a refrigerant to flow bidirectionally.

Further, the gas common passage (85), the first stop valve (V19.), the branch common passage (8e) and the second stop valve (V20) are unitized so as to be incorporated into the piping unit (11).

The refrigerant recovering passage (8b) of Example 5 shown in FIG. 10 and FIG. 11 is dispensed with in this example because it is substituted by the gas common line (8d) and the branch common passage (8e).

OPERATION OF EXAMPLE 8

Next, description is made about operations of this example.

Operations of the high-pressure reversible valve (V15) and the low-pressure reversible valve (V16) other than the first and second stop valves (V19, V20) are the same as in Example 5 shown in FIG. 10 and FIG. 11. The first and second stop valves (V19, V20) are operated, as shown in the following Table 1.

TABLE 1

| operation state | | 2A | 2B | V19 | V20 |
|---|---|---|---|---|---|
| cooling operation | (a) capacity: L. | cooling | cooling | open | close |
| | (b) capacity: S. | cooling | deactivation | close | open |
| simultaneous cooling and heating operation | (c) cooling cap.: L., heating cap.: S. | cooling | cooling | open | close |
| | (d) cooling cap.: M., heating cap.: S. | cooling | deactivation | close | open |
| | (e) cooling cap.: M., heating cap.: M. | cooling | heating | close | open |
| | (f) cooling cap.: M., heating cap.: M. | heating | cooling | close | open |
| | (g) cooling cap.: S., heating cap.: M. | heating | deactivation | open | close |
| | (h) cooling cap.: S., heating cap.: L. | heating | deactivation | open | close |
| heating operation | (i) capacity: L. | heating | heating | open | close |
| | (j) capacity: S. | heating | deactivation | open | close |

For example, when all the indoor unit (3, 3, . . .) are under cooling operation and both the first and second outdoor units (2A, 2B) are in cooling cycles (See Table 1 (a)), the high-pressure and low-pressure reversible valves (V15, V16) are closed, the first stop valve (V19) is opened and the second stop valve (V20) is closed. Thus, high-pressure refrigerants on the discharge sides of the compressors (21) of both the outdoor units (2A, 2B) are equalized in pressure and also low-pressure refrigerants on the inlet sides of the compressors (21) of both the outdoor units (2A, 2B) are equalized in pressure.

When all the indoor unit (3, 3, . . .) are under heating operation and both the first and second outdoor units (2A, 2B) are in heating cycles (See Table 1 (i)), the high-pressure and low-pressure reversible valves (V15, V16) are closed, the first stop valve (V19) is opened and the second stop valve (V20) is closed. Thus, high-pressure refrigerants on the discharge sides of the compressors (21) of both the outdoor units (2A, 2B) are equalized in pressure and also low-pressure refrigerants on the inlet sides of the compressors (21) of both the outdoor units (2A, 2B) are equalized in pressure.

In the case that: a cooling operation and a heating operation are performed to the indoor units (3, 3, . . .) at the same time; the first outdoor unit (2A) turns a cooling cycle; and the second outdoor unit (2B) turns a heating cycle (See Table 1 (e)), the high-pressure reversible valve (V15) is opened and the low-pressure reversible valve (V16) is closed. As a result, high-pressure refrigerants on the discharge sides of the compressors (21) of both the outdoor units (2A, 2B) are equalized in pressure. Further, the first stop valve (V19) is closed and the second stop valve (V20) is opened, so that low-pressure refrigerants on the inlet sides of the compressors (21) of both the outdoor units (2A, 2B) are equalized in pressure.

In the case that: a cooling operation and a heating operation are performed to the indoor units (3, 3, . . .) at the same time; the first outdoor unit (2A) turns a heating cycle; and the second outdoor unit (2B) turns a cooling cycle (See Table 1 (f)), the high-pressure reversible valve (V15) is closed and the low-pressure reversible valve (V16) is opened. As a result, low-pressure refrigerants on the inlet sides of the compressors (21) of both the outdoor units (2A, 2B) are equalized in pressure. Further, the first stop valve (V19) is closed and the second stop valve (V20) is opened, so that high-pressure refrigerants on the discharge sides of the compressors (21) of both the outdoor units (2A, 2B) are equalized in pressure.

When both the first and second outdoor units (2A, 2B) are in cooling cycles or in heating cycles (See Table 1 (a) and (i)), the first stop valve (V19) is opened, as mentioned above. Thus, in the cooling cycles, high-pressure gas refrigerants flow through the outdoor heat exchangers (24) of both the outdoor units (2A, 2B) at an approximately uniform rate. In the heating cycles, low-pressure gas refrigerants flow through the outdoor heat exchangers (24) of both the outdoor units (2A, 2B) at an approximately uniform rate.

When both the first and second outdoor units (2A, 2B) are in cooling cycles and the operation capacity of the second outdoor unit (2B) is larger than a load thereof, a part of a refrigerant discharged from the compressor (21) flows through the gas common line (8d) and into the outdoor heat exchanger (24) of the first outdoor unit (2A).

When both the first and second outdoor units (2A, 2B) are in heating cycles and the operation capacity of the second outdoor unit (2B) is larger than a load thereof, a part of a refrigerant to be sucked into the compressor (21) of the first outdoor unit (2A) flows through the gas common line (8d) and into the second outdoor unit (2B).

EFFECTS OF EXAMPLE 8

According to this example, since there are provided the gas common line (8d) having the first stop valve (V19) and the branch common passage (8e) having the second stop valve (V20), the high-pressure sensor (HPS) and the low-pressure sensor (LPS) can be shared between the first and second outdoor units (2A, 2B). This reduces the number of elements. Further, since amounts of refrigerants which flow through the respective outdoor heat exchangers (24) of the first and second outdoor units (2A, 2B) are approximately equal to each other, a coefficient of performance (COP) of the air conditioner (1) is increased.

Other constructions, operations and effects are the same as in Example 5 shown in FIG. 10.

MODIFICATION 1 OF EXAMPLE 8

Figure 16:
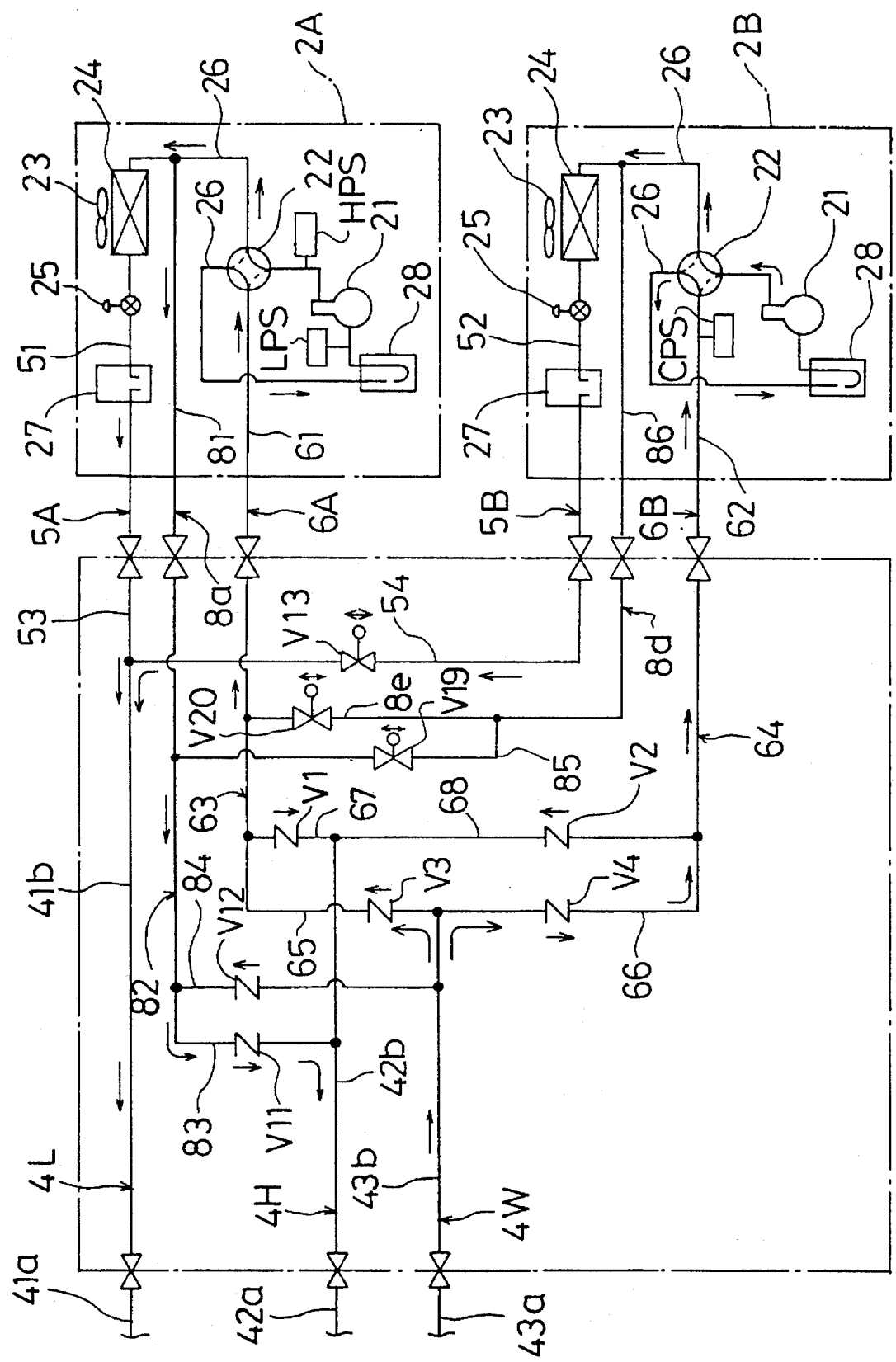
FIG. 16 is a refrigerant circuit diagram of a main part of Modification 1 of Example 8.

FIG. 16 shows a modification of Example 8 shown in FIG. 15. In the air conditioner (1) of Example 4 shown in FIG. 6, there are provided the gas common line (8d) and the branch common passage (8e) which are shown in FIG. 15, in order to share sensors between the first and second outdoor units (2A, 2B).

In detail, since the first and second stop valves (V19, V20) is operated as shown in Table 1, if only the high-pressure sensor (HPS) and the low-pressure sensor (LPS) are provided in the first outdoor unit (2A) and a single common pressure sensor (CPS) is provided in the gas pipe (62) of the second outdoor unit (2B) so as to be located on the indoor units (3, 3, . . .) side of the four-way selector valve (22), a refrigerant pressure of the second outdoor unit (2B) can be detected.

In other words, a refrigerant pressure in the gas-refrigerant pipe (26) of the outdoor heat exchanger (24) of the second outdoor unit (2B) is detected by the high-pressure sensor (HPS) and the low-pressure sensor (LPS) which are included in the first outdoor unit (2A). As a result of this, if only the common sensor (CPS) is provided in the second outdoor unit (2B), any other sensors are not required in the second outdoor unit (2B). Accordingly, the number of elements can be reduced and amounts of refrigerants which flow through the respective outdoor heat exchangers (24) of the first and second outdoor units (2A, 2B) can be approximately equal to each other. This increases a coefficient of performance (COP) of the air conditioner (1).

Other constructions, operations and effects are the same as in Example 4 shown in FIG. 6.

MODIFICATION 2 OF EXAMPLE 8

Figure 17:
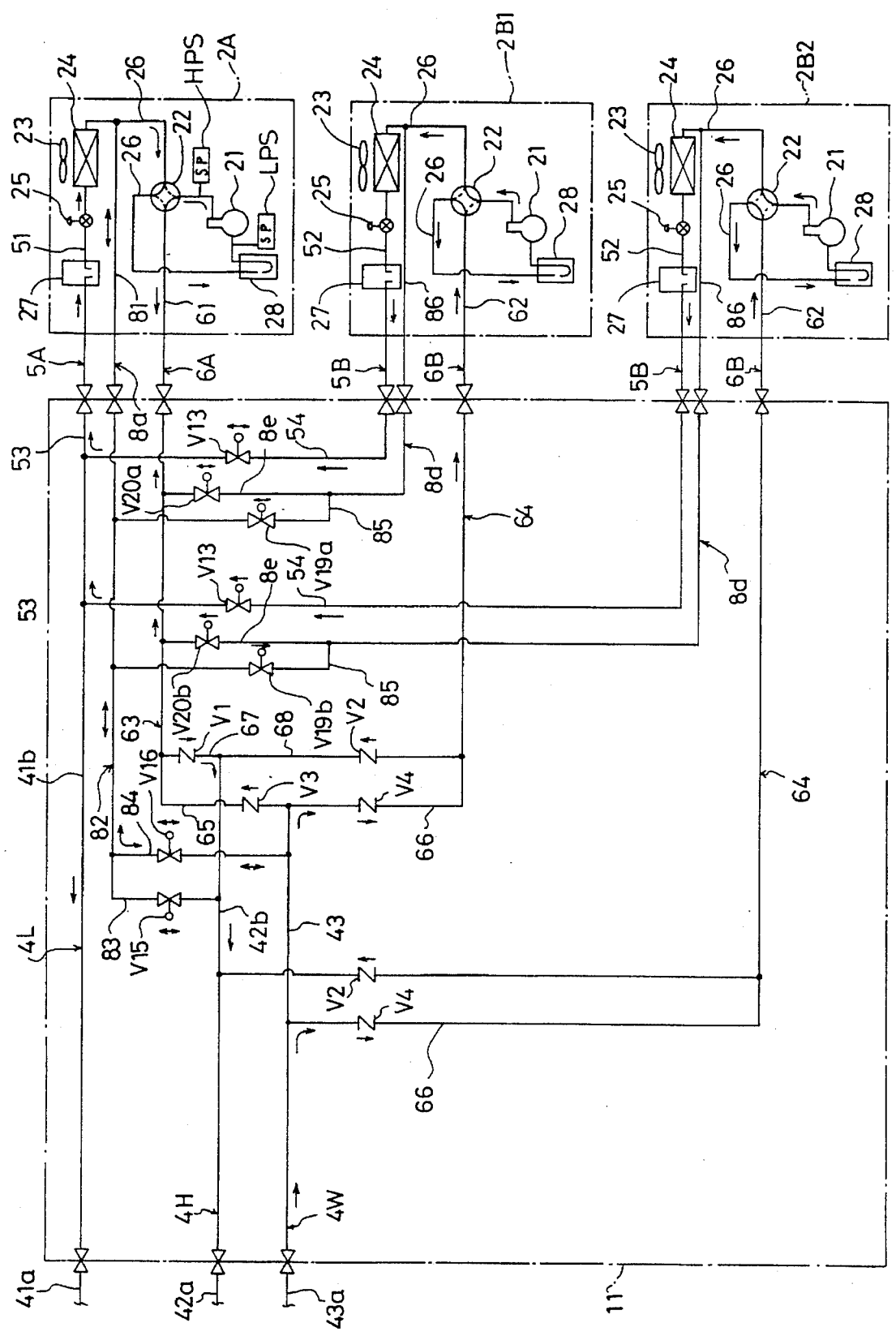
FIG. 17 is a refrigerant circuit diagram of a main part of Modification 2 of Example 8.

FIG. 17 shows a modification of Example 8 shown in FIG. 15 which is an example of a refrigeration apparatus according to claim 14 of the present invention. In this example, in addition to the first outdoor unit (2A), a second outdoor unit (2B1) and a third outdoor unit (2B2) are provided. The second outdoor unit (2B1) and the third outdoor unit (2B2) are the same as in the second outdoor unit (2B) shown in FIG. 15.

In detail, the second outdoor unit (2B1) is connected to the first outdoor unit (2A) via a gas common line (8d) having a first stop valve (V19a) and a branch common passage (8e) having a second stop valve (V20a), as in the gas common line (8d) and the branch common passage (8e) each shown in FIG. 15. The third outdoor unit (2B2) is connected to the first outdoor unit (2A) via a gas common line (8d) having a first stop valve (V19b) and a branch common passage (8e) having a second stop valve (V20b). Under this construction, sensors can be shared among the first, second and third outdoor units (2A, 2B1, 2B2), as in the example of FIG. 15.

The first stop valve (V19a), the second stop valve (V20a), the first stop valve (V19b) and the second stop valve (V20b) is operated as shown in the following Table 2, as in the example of FIG. 15.

cycle. Further, according to variations of a cooling capacity and a heating capacity, the third outdoor unit (2B2) turns a cooling cycle, a heating cycle or a deactivation state. In the cooling cycle, the first stop valve (V19b) is opened and the second stop valve (V20b) is closed. In the heating cycle, the first stop valve (V19b) is closed and the second stop valve (V20b) is opened. In the deactivation state, the first stop valve (V19b) is closed and the second stop valve (V20b) is opened. As results of the above controls of the first and second stop valves (V19b, V20b), high-pressure refrigerants on the discharge sides of the compressors (21) of all the outdoor units (2A, 2B1, 2B2) are equalized to one another and low-pressure refrigerants on the inlet sides of the compressors (21) of all the outdoor units (2A, 2B1, 2B2) are equalized to one another.

Other constructions, operations and effects are the same as in the example shown in FIG. 15.

OTHER MODIFICATIONS

In each of the examples shown in FIG. 6 to FIG. 17, the receiver (27) is provided in each of the outdoor units (2A, 2B). In stead of the receiver (27), however, a single receiver (12) may be provided in the piping unit (11) as shown in FIG. 2.

The liquid stop valve (V18) and the refrigerant recovering passage (8b) each shown in FIG. 6 may be provided in the examples shown in FIG. 1 to FIG. 5.

It is a matter of course that, as an example according to claim 9 of the present invention, the equalization passage (8c) shown in FIG. 13 and FIG. 14 can be provided in the examples shown in FIG. 1 to FIG. 5.

In each of the above examples, the piping unit (11) is provided. However, in the apparatus according to claims 1, 5, 7 and 9 of the present invention, the piping unit (11) is not necessarily provided.

In each of the above examples, two outdoor units (2A, 2B) and three indoor units (3, 3, 3) are arranged. However, a refrigeration apparatus of this invention may include three or more outdoor units and four or more indoor units.

TABLE 2

| operation state | | | 2A | 2B1 | 2B2 | V19a | V20a | V19b | V20b |
|---|---|---|---|---|---|---|---|---|---|
| cooling operation | (a) | capacity: L. | cooling | cooling | cooling | open | close | open | close |
| | (b) | capacity: M. | cooling | cooling | deactivation | open | close | close | open |
| | (c) | capacity: S. | cooling | deactivation | deactivation | close | open | close | open |
| simultaneous cooling and heating operation | (d) | cooling cap.: L., heating cap.: S. | cooling | cooling | deactivation | open | close | close | open |
| | (e) | cooling cap.: M., heating cap.: S. | cooling | deactivation | deactivation | close | open | close | open |
| | (f) | cooling cap.: M., heating cap.: M. | cooling | heating | cooling heating deactivation | close | open | open close close | close open open |
| | (g) | cooling cap.: S., heating cap.: M. | heating | deactivation | deactivation | open | close | open | close |
| | (h) | cooling cap.: S., heating cap.: L. | heating | heating | deactivation | open | close | open | close |
| heating operation | (i) | capacity: L. | heating | heating | heating | open | close | open | close |
| | (j) | capacity: M. | heating | heating | deactivation | open | close | open | close |
| | (k) | capacity: S. | heating | deactivation | deactivation | open | close | open | close |

For example, at a simultaneous cooling and heating operation where a cooling operation and a heating operation are performed to the indoor units (3, 3, . . .) at the same time (See Table 2 (f)), the first outdoor unit (2A) turns a cooling cycle and the second outdoor unit (2B1) turns a heating As an example according to claim 13 of the present invention, only the gas common line (8d) shown in FIG. 15 to FIG. 17 may be provided without the branch common passage (8e). Thus, the first stop valve (V19, V19a, V19a) is opened when the first outdoor unit (2A) and the second outdoor unit (2B, 2B1, 2B2) are all in cooling cycles or in heating cycles. For example, as mentioned in Example 8, when all the outdoor units are in cooling cycles and the operation capacity of the second outdoor unit (2B, 2B1, 2B2) is larger than a load thereof, a part of a refrigerant discharged from the compressor (21) flows through the gas common line (8d) and into the outdoor heat exchanger (24) of the first outdoor unit (2A). As a result, amounts of refrigerants which flow through the respective outdoor heat exchangers (24) can be approximately equal to one another, thereby increasing a coefficient of performance (COP) of the air conditioner.

It is a matter of course that the gas common line (8d) can be provided in Example 1 shown in FIG. 1.

Further, the gas common line (8d) and the branch common passage (8e) each shown in FIG. 15 and FIG. 17 may be provided in Example 1 shown in FIG. 1.

INDUSTRIAL APPLICABILITY

As mentioned above, according to a refrigeration apparatus of the present invention, a plurality of outdoor units can be provided and a cooling operation and a heating operation can be performed at the same time by using the outdoor units. Accordingly, the refrigeration apparatus of the present invention is suitable for air conditioning for a large building or the like.

I claim:

1. A refrigeration apparatus, comprising:

a plurality of thermal source units (2A, 2B) each of which has a compressor (21), a thermal-source-side heat exchanger (24) which is connected at an end thereof to the discharge side and the inlet side of the compressor (21) so as to be switchable between the sides of the compressor (21) and connected at the other end to each of liquid lines (5A, 5B), and a thermal-source-side expansion mechanism (25) disposed on each of the liquid lines (5A, 5B), and in which base ends of gas lines (6A, 6B) are each connected to the discharge and inlet sides of the compressor (21) so as to be switchable between the sides of the compressor (21), each of the gas lines (6A, 6B) being branched to a high-pressure passage (65, 66) for allowing a refrigerant to flow in the discharge direction of the compressor (21) and a low-pressure passage (67, 68) for allowing a refrigerant to flow in the inlet direction of the compressor (21);

a main liquid line (4L) connected to the liquid lines (5A, 5B) so that the thermal source units (2A, 2B) are arranged in parallel with one another;

a main high-pressure gas line (4H) connected to all the high-pressure passages (65, 66) so that the thermal source units (2A, 2B) are arranged in parallel with one another;

a main low-pressure gas line (4W) connected to all the low-pressure passage (67, 68) so that the thermal source units (2A, 2B) are arranged in parallel with one another; and a plurality of user units (3, 3, . . .) which has a user-side heat exchanger (32) connected at an end thereof to the main liquid line (4L), a user-side expansion mechanism (33) disposed between the user-side heat exchanger (33) and the main liquid line (4L), and in which the other end of the user-side heat exchanger (32) is connected to the main high-pressure gas line (4H) and the main low-pressure gas line (4W) so as to be switchable between the gas lines (4H, 4W).

2. The refrigeration apparatus according to claim 1, further comprising:

non-return valves (V1, V2) disposed in the respective high-pressure passages (65, 66) for allowing a refrigerant to flow from the thermal source units (2A, 2B) to the main high-pressure gas line (4H); and non-return valves (V3, V4) disposed in the respective low-pressure passages (66, 67) for allowing a refrigerant to flow from the main low-pressure gas line (4W) to the thermal source units (2A, 2B).

3. The refrigeration apparatus according to claim 1, further comprising switching means (V5-V10) for switching a flowing direction of a refrigerant by opening and closing the high-pressure passages (65, 66) and the low-pressure passages (67, 68) so that the refrigerant flows through the high-pressure passages (65, 66) from the thermal source units (2A, 2B) to the main high-pressure gas line (4H) and flows through the low-pressure passages (67, 68) from the main low-pressure gas line (4W) to the thermal source units (2A, 2B).

4. The refrigeration apparatus according to claim 1, wherein the liquid lines (5A, 5B) are so composed that respective liquid passages (53, 54) thereof are connected to outer ends of respective liquid pipes (51, 52) thereof extending outward from the thermal source units (2A, 2B), the gas lines (6A, 6B) are so composed that respective gas passages (63, 64) thereof each having the high-pressure passage (65, 66) and the low-pressure passage (67, 68) are connected to outer ends of respective gas pipes (61, 62) thereof extending outward from the thermal source units (2A, 2B), the main liquid line (4L) is so composed that a main liquid passage (41b) is connected to an end of a main liquid pipe (41a) extending at the other end thereof to the user-side heat exchanger (32), the main high-pressure gas line (4H) is so composed that a main high-pressure gas passage (42b) is connected to an end of a main high-pressure gas pipe (42a) extending at the other end thereof to the user-side heat exchanger (32), the main low-pressure gas line (4W) is so composed that a main low-pressure gas passage (43b) is connected to an end of a main low-pressure gas pipe (43a) extending at the other end thereof to the user-side heat exchanger (32), the liquid passages (53, 54), the high-pressure passages (65, 66) and the low-pressure passages (67, 68) are connected to the main liquid passage (41b), the main high-pressure gas passage (42b) and the main low-pressure gas passage (43b), respectively, and the liquid passages (53, 54), the gas passages (63, 64), the main liquid passage (41b), the main high-pressure gas passage (42b) and the main low-pressure gas passage (43b) are unitized to form a piping unit (11).

5. A refrigeration apparatus, comprising:

a plurality of thermal source units (2A, 2B) each of which has a compressor (21), a thermal-source-side heat exchanger (24) which is connected at an end thereof to the discharge side and the inlet side of the compressor (21) so as to be switchable between the sides of the compressor (21) and connected at the other end to each of liquid lines (5A, 5B), and a thermal-source-side expansion mechanism (25) disposed on each of the liquid line (5A, 5B), and in which base ends of gas lines (6A, 6B) are each connected to the discharge and inlet sides of the compressor (21) so as to be switchable between the sides of the compressor (21), each of the gas lines (6A, 6B) being branched to a high-pressure passages (65, 66) for allowing a refrigerant to flow in the discharge direction of the compressor (21) and a low-pressure passages (67, 68) for allowing a refrigerant to flow in the inlet direction of the compressor (21);

a main liquid line (4L) connected to the liquid lines (5A, 5B) so that the thermal source units (2A, 2B) are arranged in parallel with one another;

a main high-pressure gas line (4H) connected to all the high-pressure passages (65, 66) so that the thermal source units (2A, 2B) are arranged in parallel with one another;

a main low-pressure gas line (4W) connected to all the low-pressure passage (67, 68) so that the thermal source units (2A, 2B) are arranged in parallel with one another;

a plurality of user units (3, 3, . . .) which has a user-side heat exchanger (32) connected at an end thereof to the main liquid line (4L), a user-side expansion mechanism (33) disposed between the user-side heat exchanger (33) and the main liquid line (4L), and in which the other end of the user-side heat exchanger (82) is connected to the main high-pressure gas line (4H) and the main low-pressure gas line (4W) so as to be switchable between the gas lines (4H, 4W); and an auxiliary gas line (8a) having a high-pressure auxiliary passage (83) for allowing a refrigerant to flow from the thermal source unit (2A) to the main high-pressure gas line (4H) and a low-pressure auxiliary passage (84) for allowing a refrigerant to flow from the main low-pressure gas line (4W) to the thermal source unit (2A), the high-pressure auxiliary passage (83) being connected at an end thereof to a gas-refrigerant pipe (26) in which a gas refrigerant flows from and to the thermal-source-side heat exchanger (24) of one of the thermal source units (2A) and connected at the other end thereof to the main high-pressure gas line (4H), the low-pressure auxiliary passage (84) being connected at an end thereof to the gas-refrigerant pipe (26) of the thermal-source-side heat exchanger (24) of one of the thermal source units (2A) and connected at the other end thereof to the main low-pressure gas line (4W).

6. The refrigeration apparatus according to claim 5, wherein:

the liquid lines (5A, 5B) are so composed that respective liquid passages (53, 54) thereof are connected to outer ends of respective liquid pipes (51, 52) thereof extending outward from the thermal source units (2A, 2B);

the gas lines (6A, 6B) are so composed that respective gas passages (63, 64) thereof each having the high-pressure passage (65, 66) and the low-pressure passage (67, 68) are connected to outer ends of respective gas pipes (61, 62) thereof extending outward from the thermal source units (2A, 2B);

the main liquid line (4L) is so composed that a main liquid passage (41b) is connected to an end of a main liquid pipe (41a) extending at the other end thereof to the user-side heat exchanger (32);

the main high-pressure gas line (4H) is so composed that a main high-pressure gas passage (42b) is connected to an end of a main high-pressure gas pipe (42a) extending at the other end thereof to the user-side heat exchanger (32);

the main low-pressure gas line (4W) is so composed that a main low-pressure gas passage (43b) is connected to an end of a main low-pressure gas pipe (43a) extending at the other end thereof to the user-side heat exchanger (32);

the auxiliary gas line (8a) is so composed that an auxiliary gas pipe (81) extending outward from the thermal source unit (2A) is connected at an outer end thereof to an auxiliary gas passage (82) having the high-pressure auxiliary passage (83) and the low-pressure auxiliary passage (84);

the liquid passages (53, 54) are connected to the main liquid passage (41b);

the high-pressure passages (65, 66) and the high-pressure auxiliary passage (83) are connected to the main high-pressure gas passage (42b);

the low-pressure passages (67, 68) and the low-pressure auxiliary passage (84) are connected to the main low-pressure gas passage (43b); and the liquid passages (53, 54), the gas passages (63, 64), the main liquid passage (41b), the main high-pressure gas passage (42b), the main low-pressure gas passage (43b) and the auxiliary gas passage (82) are unitized to form a piping unit (11).

7. The refrigeration apparatus according to claim 5, further comprising:

an equalization passage (8c) which is connected between the main high-pressure gas line (4H) and the main low-pressure gas line (4W) and which has an equalizing and closing mechanism (V17) for allowing and preventing a flow of refrigerant from the main high-pressure gas line (4H) to the main low-pressure gas line (4W); and an auxiliary closing mechanism (V18) disposed on the auxiliary gas line (8a) for allowing and preventing a flow of refrigerant.

8. A refrigeration apparatus, comprising:

a plurality of thermal source units (2A, 2B) each of which has a compressor (21), a thermal-source-side heat exchanger (24) which is connected at an end thereof to the discharge side and the inlet side of the compressor (21) so as to be switchable between the sides of the compressor (21) and connected at the other end to each of liquid lines (5A, 5B), and a thermal-source-side expansion mechanism (25) disposed on each of the liquid lines (5A, 5B), and in which base ends of gas lines (6A, 6B) are each connected to the discharge and inlet sides of the compressor (21) so as to be switchable between the sides of the compressor (21), each of the gas lines (6A, 6B) being branched to a high-pressure passage (65, 66) for allowing a refrigerant to flow in the discharge direction of the compressor (21) and a low-pressure passage (67, 68) for allowing a refrigerant to flow in the inlet direction of the compressor (21);

a main liquid line (4L) connected to the liquid lines (5A, 5B) so that the thermal source units (2A, 2B) are arranged in parallel with one another;

a main high-pressure gas line (4H) connected to all the high-pressure passages (65, 66) so that the thermal source units (2A, 2B) are arranged in parallel with one another;

a main low-pressure gas line (4W) connected to all the low-pressure passage (67, 68) so that the thermal source units (2A, 2B) are arranged in parallel with one another;

a plurality of user units (3, 3, . . .) which has a user-side heat exchanger (32) connected at an end thereof to the main liquid line (4L), a user-side expansion mechanism (38) disposed between the user-side heat exchanger (33) and the main liquid line (4L), and in which the other end of the user-side heat exchanger (32) is connected to the main high-pressure gas line (4H) and the main low-pressure gas line (4W) so as to be switchable between the gas lines (4H, 4W); and an auxiliary gas line (8a) having a high-pressure auxiliary passage (83) for allowing a refrigerant to flow in both directions between the thermal source unit (2A) and the main high-pressure gas line (4H) and a low-pressure auxiliary passage (84) for allowing a refrigerant to flow in both directions between the main low-pressure gas line (4W) and the thermal source unit (2A), the high-pressure auxiliary passage (83) being connected at an end thereof to a gas-refrigerant pipe (26) in which a gas refrigerant flows from and to the thermal-source-side heat exchanger (24) of one of the thermal source units (2A) and connected at the other end thereof to the main high-pressure gas line (4H), the low-pressure auxiliary passage (84) being connected at an end thereof to the gas-refrigerant pipe (26) of the thermal-source-side heat exchanger (24) of one of the thermal source units (2A) and connected at the other end thereof to the main low-pressure gas line (4W).

9. The refrigeration apparatus according to claim 8, wherein:

the liquid lines (5A, 5B) are so composed that respective liquid passages (53, 54) thereof are connected to outer ends of respective liquid pipes (51, 52) thereof extending outward from the thermal source units (2A, 2B);

the gas lines (6A, 6B) are so composed that respective gas passages (63, 64) thereof each having the high-pressure passage (65, 66) and the low-pressure passage (67, 68) are connected to outer ends of respective gas pipes (61, 62) thereof extending outward from the thermal source units (2A, 2B);

the main liquid line (4L) is so composed that a main liquid passage (41b) is connected to an end of a main liquid pipe (41a) extending at the other end thereof to the user-side heat exchanger (32);

the main high-pressure gas line (4H) is so composed that a main high-pressure gas passage (42b) is connected to an end of a main high-pressure gas pipe (42a) extending at the other end thereof to the user-side heat exchanger (32);

the main low-pressure gas line (4W) is so composed that a main low-pressure gas passage (43b) is connected to an end of a main low-pressure gas pipe (43a) extending at the other end thereof to the user-side heat exchanger (32);

the auxiliary gas line (8a) is so composed that an auxiliary gas pipe (81) extending outward from the thermal source unit (2A) is connected at an outer end thereof to an auxiliary gas passage (82) having the high-pressure auxiliary passage (83) and the low-pressure auxiliary passage (84);

the liquid passages (53, 54) are connected to the main liquid passage (41b);

the high-pressure passages (65, 66) and the high-pressure auxiliary passage (88) are connected to the main high-pressure gas passage (42b);

the low-pressure passages (87, 68) and the low-pressure auxiliary passage (84) are connected to the main low-pressure gas passage (43b); and the liquid passages (53, 54), the gas passages (63, 64), the main liquid passage (41b), the main high-pressure gas passage (42b), the main low-pressure gas passage (43b) and the auxiliary gas passage (82) are unitized to form a piping unit (ii).

10. The refrigeration apparatus according to claim 8, further comprising an equalization passage (8c) which is connected between the main high-pressure gas line (4H) and the main low-pressure gas line (4W) and which has an equalizing and closing mechanism (V17) for allowing and preventing a flow of refrigerant from the main high-pressure gas line (4H) to the main low-pressure gas line (4W).

11. A refrigeration apparatus, comprising:

a plurality of thermal source units (2A, 2B) each of which has a compressor (21), a thermal-source-side heat exchanger (24) which is connected at an end thereof to the discharge side and the inlet side of the compressor (21) so as to be switchable between the sides of the compressor (21) and connected at the other end to each of liquid lines (5A, 5B), and a thermal-source-side expansion mechanism (25) disposed on each of the liquid lines (5A, 5B), and in which base ends of gas lines (6A, 6B) are each connected to the discharge and inlet sides of the compressor (21) so as to be switchable between the sides of the compressor (21), each of the gas lines (6A, 6B) being branched to a high-pressure passage (65, 66) for allowing a refrigerant to flow in the discharge direction of the compressor (21) and a low-pressure passage (67, 68) for allowing a refrigerant to flow in the inlet direction of the compressor (21);

a main liquid line (4L) connected to the liquid lines (5A, 5B) so that the thermal source units (2A, 2B) are arranged in parallel with one another;

a main high-pressure gas line (4H) connected to all the high-pressure passages (65, 66) so that the thermal source units (2A, 2B) are arranged in parallel with one another;

a main low-pressure gas line (4W) connected to all the low-pressure passage (67, 68) so that the thermal source units (2A, 2B) are arranged in parallel with one another;

a plurality of user units (3, 3, . . .) which has a user-side heat exchanger (32) connected at an end thereof to the main liquid line (4L), a user-side expansion mechanism (33) disposed between the user-side heat exchanger (33) and the main liquid line (4L), and in which the other end of the user-side heat exchanger (32) is connected to the main high-pressure gas line (4H) and the main low-pressure gas line (4W) so as to be switchable between the gas lines (4H, 4W); and an equalization passage (8c) which is connected between the main high-pressure gas line (4H) and the main low-pressure gas line (4W) and which has an equalizing and closing mechanism (V17) for allowing and preventing a flow of refrigerant from the main high-pressure gas line (4H) to the main low-pressure gas line (4W).

12. The refrigeration apparatus according to claim 11, wherein:

the liquid lines (5A, 5B) are so composed that respective liquid passages (53, 54) thereof are connected to outer ends of respective liquid pipes (51, 52) thereof extending outward from the thermal source units (2A, 2B);

the gas lines (6A, 6B) are so composed that respective gas passages (63, 64) thereof each having the high-pressure passage (65, 66) and the low-pressure passage (67, 68)

are connected to outer ends of respective gas pipes (61, 62) thereof extending outward from the thermal source units (2A, 2B);

the main liquid line (4L) is so composed that a main liquid passage (41*b*) is connected to an end of a main liquid pipe (41*a*) extending at the other end thereof to the user-side heat exchanger (32);

the main high-pressure gas line (4H) is so composed that a main high-pressure gas passage (42*b*) is connected to an end of a main high-pressure gas pipe (42*a*) extending at the other end thereof to the user-side heat exchanger (32);

the main low-pressure gas line (4W) is so composed that a main low-pressure gas passage (43*b*) is connected to an end of a main low-pressure gas pipe (43*a*) extending at the other end thereof to the user-side heat exchanger (32);

the liquid passages (53, 54) are connected to the main liquid passage (41*b*);

the high-pressure passages (65, 66) are connected to the main high-pressure gas passage (42*b*);

the low-pressure passages (67, 68) are connected to the main low-pressure gas passage (43*b*);

the equalization passage (8*c*) is connected to the main high-pressure gas passage (42*b*) and the main low-pressure gas passage (43*b*); and the liquid passages (53, 54), the gas passages (63, 64), the main liquid passage (41*b*), the main high-pressure gas passage (42*b*), the main low-pressure gas passage (43*b*) and the equalization passage (8*c*) are unitized to form a piping unit (11).

13. The refrigeration apparatus according to any one claims 1–12, further comprising a gas common line (8*d*) which is communicated with the gas-refrigerant pipes (26) of the thermal-source-side heat exchangers (24) of all the thermal source units (2A, 2B) and has a closing mechanism (V19) for allowing a flow of refrigerant when all the thermal source units (2A, 2B) are in the same refrigerating cycles.

14. The refrigeration apparatus according to any one of claims 1–12, further comprising:

a gas common line (8*d*) which establishes communications between the gas-refrigerant pipe (26) of the thermal-source-side heat exchanger (24) of one thermal source unit (2A) and the gas-refrigerant pipe (26) of the thermal-source-side heat exchanger (24) of another thermal source unit (2B) and has a first closing mechanism (V19) for allowing a refrigerant to flow in both directions between the gas-refrigerant pipes (26); and a branch common passage (8*e*) which is communicated at an end thereof with the gas line (6A) of the former thermal source unit (2A), communicated at the other end thereof with the gas common line (8*d*) so as to connected between the latter thermal source unit (2B) and the first closing mechanism (V19) and provided with a second closing mechanism (V20) for allowing a refrigerant to flow in both directions between the gas line (6A) and the gas common line (8*d*).

15. The refrigeration apparatus according to one of claim 1–12, further comprising a receiver (12) which is disposed at a connecting part between the main liquid line (4L) and the liquid lines (5A, 5B) extending from the thermal source units (2A, 2B) and connects the liquid lines (5A, 5B) to the main liquid line (4L).

16. The refrigeration apparatus according to any one of claims 1–12, further comprising a liquid-line closing mechanism (V13) which is disposed on the liquid line (5B) of one of the thermal source units (2B) so as to be in the proximity of a connecting part between the liquid line (5B) and the main liquid line (4L) and fully closes when the thermal source unit (2B) is deactivated during refrigerating operation.

17. The refrigeration apparatus according to one of claims 1–12, wherein a refrigerant recovering passage (8*b*) having a recovery closing mechanism (V14) which opens when one thermal source unit (2B) is deactivated during refrigerating operation is connected between the main low-pressure gas line (4W) and a portion of the gas line (6B) which is located on the thermal source unit's (2B) side of the high-pressure passage (66) and the low-pressure passage (68).

\* \* \* \* \*